US 9,246,365 B2

(12) United States Patent
Honda et al.

(10) Patent No.: US 9,246,365 B2
(45) Date of Patent: Jan. 26, 2016

(54) REGULATION OF PERMANENT MAGNET MOTION IN A BRUSHLESS MOTOR

(71) Applicant: AISAN KOGYO KABUSHIKI KAISHA, Aichi-ken (JP)

(72) Inventors: Yoshihiko Honda, Aichi-ken (JP); Yoichi Kawakita, Aichi-ken (JP); Kazumichi Hanai, Aichi-ken (JP)

(73) Assignee: AISAN KOGYO KABUSHIKI KAISHA, Aichi-Ken (JP)

( * ) Notice: Subject to any disclaimer, the term of this patent is extended or adjusted under 35 U.S.C. 154(b) by 334 days.

(21) Appl. No.: 13/745,593

(22) Filed: Jan. 18, 2013

(65) Prior Publication Data

US 2013/0187487 A1    Jul. 25, 2013

(30) Foreign Application Priority Data

Jan. 23, 2012  (JP) ................ 2012-010803
May 14, 2012  (JP) ................ 2012-110523
Jul. 26, 2012  (JP) ................ 2012-165535

(51) Int. Cl.
  *H02K 1/28*   (2006.01)
  *H02K 1/27*   (2006.01)
  *H02K 1/30*   (2006.01)

(52) U.S. Cl.
  CPC .............. *H02K 1/28* (2013.01); *H02K 1/278* (2013.01); *H02K 1/30* (2013.01)

(58) Field of Classification Search
  CPC ............ H02K 1/278; H02K 1/28; H02K 1/30
  USPC ........................ 310/156.16, 156.22
  See application file for complete search history.

(56) References Cited

U.S. PATENT DOCUMENTS

| 4,954,736 | A | * | 9/1990 | Kawamoto et al. ...... 310/156.21 |
| 4,973,872 | A | * | 11/1990 | Dohogne ................. 310/156.28 |
| 5,574,323 | A | * | 11/1996 | Nusser .................... 310/156.22 |

(Continued)

FOREIGN PATENT DOCUMENTS

| CN | 1622426 A | 6/2005 |
| CN | 102308456 A | 1/2012 |

(Continued)

OTHER PUBLICATIONS

Se-Dong Baek et al.,Machine Translation of KR1020080095647, Oct. 2008.*

(Continued)

*Primary Examiner* — Quyen Leung
*Assistant Examiner* — Eric Johnson
(74) *Attorney, Agent, or Firm* — Vienna Magen Marcus LLP

(57) ABSTRACT

A brushless motor may comprise a rotor comprising a shaft, a back yoke fixed on the shaft, a permanent magnet disposed at an outer circumference of the back yoke and first and second resin portions. The first resin portion may be formed at one ends of the back yoke and the permanent magnet and the second resin portion may be formed at other ends. The first and second resin portions may be fixed the back yoke and the permanent magnet. A communication hole communicating one end side and another end side in the shaft axis direction may be formed through the back yoke or between the shaft and the back yoke. A third resin portion connecting with the first and the second resin portions may be formed within the communication hole. The first, second and third resin portions may be formed integrally.

8 Claims, 30 Drawing Sheets

(56) References Cited

U.S. PATENT DOCUMENTS

| | | | |
|---|---|---|---|
| 2005/0116568 A1 | 6/2005 | Suga et al. | |
| 2007/0065314 A1 | 3/2007 | Nagata | |
| 2009/0108694 A1 | 4/2009 | Hanai | |
| 2011/0000079 A1 | 1/2011 | Fukumaru et al. | |
| 2011/0291498 A1 | 12/2011 | Sakata et al. | |

FOREIGN PATENT DOCUMENTS

| | | | | |
|---|---|---|---|---|
| DE | 19942029 A1 | * | 3/2001 | ............... H02K 1/28 |
| EP | 459355 A1 | * | 12/1991 | ............... H02K 1/27 |
| EP | 1796247 A2 | | 6/2007 | |
| JP | S63-124074 | | 8/1988 | |
| JP | H03-001665 U | | 1/1991 | |
| JP | 0374151 A | | 3/1991 | |
| JP | 0350942 U | | 5/1991 | |
| JP | 03143238 A | * | 6/1991 | ............... H02K 1/27 |
| JP | H6-48382 | | 6/1994 | |
| JP | 6205572 | | 7/1994 | |
| JP | H07-177702 A | | 7/1995 | |
| JP | 07312852 A | | 11/1995 | |
| JP | 09182334 A | | 7/1997 | |
| JP | 09289747 A | | 11/1997 | |
| JP | 10201152 | | 7/1998 | |
| JP | H63-290147 | | 11/1998 | |
| JP | 200137122 | | 2/2001 | |
| JP | 2002-10545 | | 1/2002 | |
| JP | 2004104928 | | 4/2004 | |
| JP | 2004147395 A | * | 5/2004 | ............... H02K 1/27 |
| JP | 2004183863 A | | 7/2004 | |
| JP | 2007124845 | | 5/2007 | |
| JP | 2007215301 A | | 8/2007 | |
| JP | 2009296811 A | | 12/2009 | |
| JP | 2010141993 A | | 6/2010 | |
| JP | 2010283978 A | * | 12/2010 | |
| JP | 2011135735 | | 7/2011 | |
| KR | 20060133865 A | | 12/2006 | |
| KR | 20080095647 A | | 10/2008 | |
| KR | 100905902 B1 | | 7/2009 | |

OTHER PUBLICATIONS

Office Action dated Nov. 3, 2014 in Chinese Patent Application No. 201310022656.9, with English language translation, 15 pages.
English abstract of KR100905902, published Jul. 2, 2009.
English abstract of KR20060133865, published Dec. 27, 2006.
English abstract and Patent Family List of CN102308456, published Jan. 4, 2012.
Machine Translation of Japanese Patent Application No. JP H6-48382 prepared by the Japanese Patent Office.
English Translation of Abstract of Japanese Patent Application No. JP10201152.
Machine Translation of Japanese Patent Application No. JP 10201152 prepared by the Japanese Patent Office.
English Translation of Abstract of Japanese Patent Application No. JP 2002-10545.
Machine Translation of Japanese Patent Application No. JP 2002-10545 prepared by the Japanese Patent Office.
English Translation of Abstract of Japanese Patent Application No. JP H63-290147.
English Translation of Abstract of Japanese Patent Application No. JP 6205572.
Machine Translation of Japanese Patent Application No. JP 6205572 prepared by the Japanese Patent Office.
English Abstract of Japanese Application Publication No. JP S63-124074.
English Translation of Abstract of Japanese Patent Application No. JP 2011135735.
Machine Translation of Japanese Patent Application No. JP 2011135735 prepared by the Japanese Patent Office.
English Translation of Abstract of Japanese Patent Application No. JP 200137122.
Machine Translation of Japanese Patent Application No. JP 200137122 prepared by the Japanese Patent Office.
Family List of Japanese Patent Application No. JP 2007124845.
English Translation of Abstract of Japanese Patent Application No. JP 2007124845.
Machine Translation of Japanese Patent Application No. JP 2007124845 prepared by the Japanese Patent Office.
English Translation of Abstract of Japanese Patent Application No. JP 2004104928.
Machine Translation of Japanese Patent Application No. JP 2004104928 prepared by the Japanese Patent Office.
Office Action dated Aug. 5, 2014 in Korean Patent Application No. 2013-0006630, with English language translation, 8 pages.
English abstract of JP2010-141993, published Jun. 24, 2010, 1 page.
English machine translation of JP2010-141993, published Jun. 24, 2010, prepared by the Japanese Patent Office, 7 pages.
Office Action dated Apr. 14, 2014 in Korean Patent Application No. 2013-0006630, with English language translation, 12 pages.
English abstract of JP2009-296811, dated Dec. 17, 2009, 1 page.
English abstract of KR2009-0095647, dated Oct. 29, 2008, 1 page.
English machine translation of JP2009-296811, Dec. 17, 2009, prepared by the Japanese Patent Office, 13 pages.
Office Action dated Apr. 14, 2015 in Japanese Patent Application No. 2012-010803, with English language translation, 9 pages.
English abstract and English machine translation of JP07312852A, published Nov. 28, 1995.
English abstract of JP0374151A, published Mar. 28, 1991.
English abstract and English machine translation of JP09182334A, published Jul. 11, 1997.
English abstract and English machine translation of JP09289747A, published Nov. 4, 1997.
Concise English Statement for Japanese Utility Model No. JP035094 published May 17, 1991.
Office Action with English translation dated May 7, 2015 in Chinese Patent Application No. 201310022656.9, 18 pages.
English Abstract and family list for Chinese Publication No. CN1622426(A) dated Jun. 1, 2005.
Office Action dated Sep. 24, 2015 in Japanese Patent Application No. 2012-10803.
Office Action dated Nov. 17, 2015 in Japanese Patent Application No. 2012-165535.

* cited by examiner

REGULATION OF PERMANENT MAGNET MOTION IN A BRUSHLESS MOTOR

CROSS-REFERENCE TO RELATED APPLICATIONS

This application claims priorities to Japanese Patent Application No. 2012-010803, filed on Jan. 23, 2012, Japanese Patent Application No. 2012-110523, filed on May 14, 2012 and Japanese Patent Application No. 2012-165535, filed on Jul. 26, 2012, the contents of which are hereby incorporated by reference into the present application.

TECHNICAL FIELD

A technique disclosed in this specification relates to a brushless motor.

DESCRIPTION OF RELATED ART

Japanese Utility Model Application Publication No. H6-48382 discloses a brushless motor. In this brushless motor, a rotor includes a shaft, a back yoke disposed at an outer circumference of the shaft, and a permanent magnet disposed at an outer circumference of the back yoke.

In the brushless motor disclosed in Japanese Utility Model Application Publication No. H6-48382, a resin portion is formed on both ends in a shaft axis direction of the permanent magnet and the back yoke. Moreover, a resin portion is also formed on an entire inner circumferential surface of the back yoke. The permanent magnet and the back yoke are integrated by the resin portion. A bearing is formed in the resin portion that is formed on the inner circumferential surface of the back yoke, and the shaft engages with the bearing. Due to this, the shaft, the back yoke, and the permanent magnet are integrated.

SUMMARY

In the above brushless motor, since the resin portion is formed on the entire inner circumferential surface of the back yoke, the bearing that engages with the shaft needs to be formed in the resin portion. Thus, a centrifugal force that generates when the rotor rotates acts on the bearing that is formed in the resin portion. Therefore, the bearing formed in the resin portion needs to have a relatively large mechanical strength, and the size of the rotor increases.

This specification aims to provide a technique for easily integrating a shaft, a back yoke, and a permanent magnet while suppressing the size of a rotor from increasing and securing a force for allowing the back yoke to be held by the shaft.

A brushless motor disclosed herein may comprise a rotor and a stator. The stator may be disposed at an outer circumference of the rotor. The rotor may comprise a shaft, a back yoke fixed on the shaft, a permanent magnet disposed at an outer circumference of the back yoke, a first resin portion and a second resin portion. The first resin portion may be formed at one ends of the back yoke and the permanent magnet in a shaft axis direction. The first resin portion may be configured to fix the back yoke and the permanent magnet. The second resin portion may be formed at other ends of the back yoke and the permanent magnet in the shaft axis direction. The second resin portion may be configured to fix the back yoke and the permanent magnet. A communication hole that communicates one end side and another end side in the shaft axis direction may be formed through the back yoke, between the shaft and the back yoke, or in a combination thereof. "In a combination thereof" as aforementioned refers to a case in which a communication hole is formed through the back yoke, and another communication hole is formed between the shaft and the back yoke. A third resin portion may be formed within the communication hole. The third resin portion may be configured to connect with the first resin portion and the second resin portion. The first resin portion, the second resin portion and the third resin portion may be formed integrally.

In this brushless motor, since the shaft is fixed to the back yoke, the resin portion does not require a holding force (i.e., a force for allowing the back yoke to be held by the shaft) against the centrifugal force. Thus, a mechanical strength required for the resin portion may be decreased and the size of the rotor may be suppressed from increasing. Further, the communication hole is formed in the back yoke and/or between the shaft and the back yoke. Thus, the third resin portion that is formed in the communication hole may be integrally formed with the first and second resin portions for fixing the back yoke and the permanent magnet. Due to this, the shaft, the back yoke, and the permanent magnet may be easily integrated. Therefore, the size of the rotor from increasing may be suppressed while appropriately supporting the permanent magnet.

DETAILED DESCRIPTION

Figure 1:
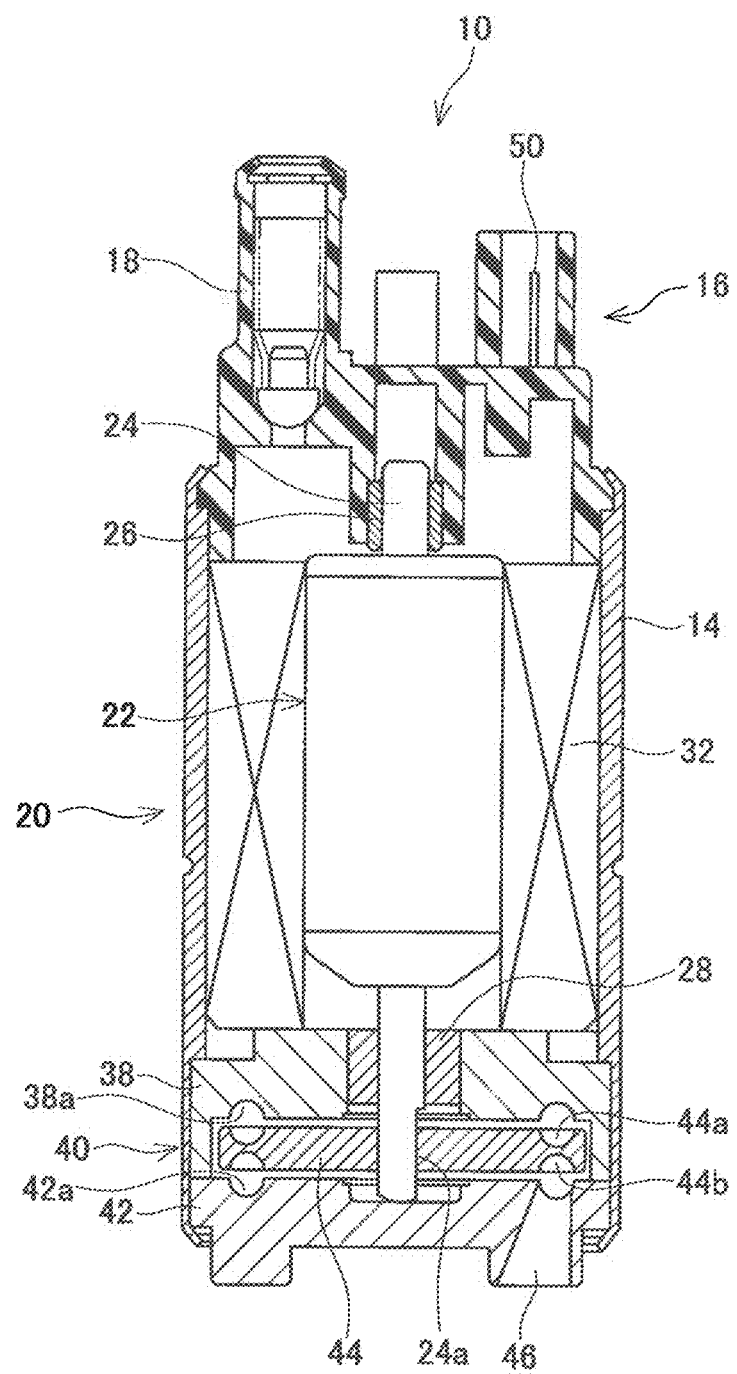
FIG. 1 shows a longitudinal cross-sectional view of a fuel pump according to a first embodiment.

Some features of the brushless motor disclosed herein will be described. The brushless motor disclosed herein may further comprise a fourth resin portion configured to cover an outer circumferential surface of the permanent magnet. The first resin portion, the second resin portion, the third resin portion and the fourth resin portion may be formed integrally. According to this configuration, the back yoke and the permanent magnet may be reliably integrated.

In the brushless motor disclosed herein, the permanent magnet may be configured to be divided into a plurality of areas in a circumferential direction of the permanent magnet. The plurality of areas of the permanent magnet may be magnetized alternately in different directions. In a cross-section perpendicular to the shaft axis, at least a part of the communication hole may be positioned on a line connecting a center of the plurality of areas in the circumferential direction and the shaft axis. According to this configuration, a magnetic flux that flows from the respective divided areas of the permanent magnet into an adjacent area through the back yoke is unlikely to be divided by the communication hole, and an increase in a magnetic resistance may be suppressed.

In the brushless motor disclosed herein, the back yoke may include a through hole configured to pass through a center of the back yoke in the shaft axis direction. The shall may be press-fitted into the through hole of the back yoke. According to this configuration, the shaft may be fixed to the back yoke in a simple method.

In the brushless motor disclosed herein, the back yoke may include a through hole configured to pass through a center of the back yoke in the shaft axis direction. In a cross-section perpendicular to the shaft axis, an outer shape of the shaft may be a circular shape, and the through hole of the back yoke has a polygonal shape. The communication hole may be formed between an outer circumferential surface of the shaft and the through hole of the back yoke. According to this configuration, by forming the through-hole of the back yoke the polygonal shape, the communication hole may be formed easily.

In the brushless motor disclosed herein, the permanent magnet may comprise a plurality of partial permanent magnets, each of which has a cross-section perpendicular to the shaft axis in an arc shape. A circumferential position regulating portion may be formed in the back yoke. The circumferential position regulating portion may be configured to regulate a position of the partial permanent magnets at least one point of an entire length of the permanent magnet in the shaft axis direction. According to this configuration, the partial permanent magnets may be positioned at appropriate positions.

In the brushless motor disclosed herein, the rotor may further comprise a magnet holder disposed on at least the one end of the permanent magnet in the shaft axis direction. The magnet holder may be configured to regulate the permanent magnet to move in the shaft axis direction and a circumferential direction of the permanent magnet. According to this configuration, the permanent magnet may be positioned at an appropriate position.

The brushless motor disclosed herein may further comprise a pressing member fixed on the shaft. The pressing member may be configured to cause the back yoke contact the magnet holder in the shaft axis direction. When the resin portion is formed integrally, a resin may be suppressed by the pressing member from leaking to an outer circumferential surface of the permanent magnet. In this case, an outer diameter of the pressing member may be larger than an outer diameter of the permanent magnet. According to this configuration, since deburring of a resin may be performed at the outer circumferential surface of the pressing member, and the resin may be suppressed from leaking to the outer circumferential surface of the permanent magnet over the outer circumferential surface of the of the pressing member, the pressing member may have a function of adjusting a weight balance of the rotor.

In the brushless motor disclosed herein, the magnet holder may comprise a base portion and a plurality of peripheral wall portions. The base portion may be configured to oppose an end face of the permanent magnet. Each of the plurality of peripheral wall portions may be configured to contact a contacting part of an outer circumferential surface of the permanent magnet located at the one end of the permanent magnet, and extend along a circumferential direction of the permanent magnet. The base portion may comprise a plurality of outer circumference parts, an inner circumference part and a beam part. The plurality of outer circumference parts may be configured to connect to the plurality of peripheral wall portions. The inner circumference part may be configured to be located closer to the shaft than the plurality of outer circumference parts and surround the shaft. The beam part may be configured to connect the plurality of outer circumference parts and the inner circumference part. The beam part may be capable of deforming such that the outer circumference parts depart from the inner circumference part.

In this brushless motor, the peripheral wall portions of the magnet holder contacts the outer circumferential surface of the permanent magnet. As a result, the permanent magnet may be suppressed from being separated from the back yoke. The permanent magnet may be supported appropriately by the magnet holder. In the magnet holder, the outer circumference parts separate from inner circumference part by deforming the beam part. As a result, an area surrounded by the plurality of peripheral wall portions may become larger. In this configuration, when the magnet holder is engaged with the permanent magnets, the peripheral wall portions may be suppressed from being inclined toward the outer side of the rotor. Therefore, it is not necessary to increase the clearance between the permanent magnets and the stator by taking the inclination of the peripheral wall portions into consideration. According to this configuration, the permanent magnet may be supported appropriately and the motor efficiency may not decrease.

In the brushless motor disclosed herein, in a direction perpendicular to the shaft axis, the contacting parts of the outer circumferential surface of the permanent magnet may be formed closer to the shaft than other parts of the outer circumferential surface of the permanent magnet.

According to this configuration, the amount of protrusion of the peripheral wall portion that protrudes from the outer circumferential surface of the permanent magnet toward the outer side of the rotor may be decreased. As a result, it is not necessary to provide a large clearance between the permanent magnet and the stator by taking the portion of the peripheral wall portion that protrudes from the outer circumferential surface of the permanent magnet into consideration.

In the brushless motor disclosed herein, each of the plurality of the peripheral wall portions may be connected to the corresponding outer circumference part at a connecting part extending along the outer circumferential surface of the permanent magnet. In a plane perpendicular to the shaft axis, an angle between a line connecting one end of the connecting part and a shaft center and a line connecting another end of the connecting part and the shaft center may be equal to or more than 40 degrees.

According to this configuration, the permanent magnet may be appropriately suppressed from being displaced toward the outer side of the rotor according to rotation of the rotor. As a result, it is not necessary to provide a large clearance between the rotor and the stator by taking the displacement of the permanent magnet during rotation of the rotor into consideration.

Each of the plurality of outer circumference parts may be connected to the inner circumference part by two or more beam parts.

According to this configuration, the magnet holder may support the permanent magnet stably as compared to a configuration in which one beam portion is formed on one outer circumferential portion.

The rotor may further comprise a pressing member configured to contact a surface of the base portion at an opposite side from the permanent magnet, and press the base portion from the opposite side from the permanent magnet toward the permanent magnet.

According to this configuration, the base portion of the magnet holder may be suppressed from being deformed in the shaft axis direction. As a result, the magnet holder may support the permanent magnet stably.

In the direction perpendicular of the shaft axis, an outer diameter of the pressing member may be larger than an outer diameter of the permanent magnet and an outer diameter of the magnet holder.

According to this configuration, the weight balance for stabilizing the rotation of the rotor may be adjusted by using the pressing member.

The rotor may further comprise fifth resin portion configured to regulate deformation of the beam part.

According to this configuration, the deformation of the beam part may be suppressed during rotation of the rotor. As a result, the magnet holder may support the permanent magnet stably.

The base portion may comprise, in each of the plurality of the outer circumference parts, a contacting hole configured to pass through the base portion in the shaft axis direction at a position located circumferentially outside the beam part connected to the outer circumference part. The fifth resin portion may be disposed in the contacting hole. Each of the plurality of the outer circumference parts may comprise a contacting portion configured to contact the fifth resin portion disposed within the contacting hole from an inner circumferential side.

According to this configuration, since the contacting portion makes contact with the inner circumference of the fifth resin member, the outer circumference part is suppressed from being moved toward the outer side. As a result, a deformation of the beam part may be appropriately suppressed during rotation of the rotor.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved brushless motor.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(First Embodiment)

Hereinafter, a brushless motor according to a first embodiment will be described. The brushless motor according to this embodiment is used in a fuel pump 10 for automobiles. The fuel pump 10 is disposed in a fuel tank so as to supply fuel in the fuel tank to an engine of an automobile. First, the configuration of the fuel pump 10 will be described.

As shown in FIG. 1, the fuel pump 10 includes a motor portion (that is, a brushless motor) 20 and a pump portion 40, and the motor portion 20 and the pump portion 40 are accommodated in a housing 14. The housing 14 is formed in an approximately cylindrical form. The motor portion 20 is disposed on an upper side of the housing 14, and the pump portion 40 is accommodated in a lower side of the housing 14. A motor cover 16 is fixed to an upper edge of the housing 14. A discharge port 18 that is open upward and a connector terminal 50 that is connected to an external power supply are formed on the motor cover 16.

The motor portion 20 includes a rotor 22 and a stator 32 that is disposed at an outer circumference of the rotor 22. As will be described later, the rotor 22 includes a shaft 24, a back yoke 62 (shown in FIG. 2), and permanent magnets 64a to 64d (shown in FIG. 2). The shaft 24 is rotatably supported by bearings 26 and 28 in relation to the housing 14. The stator 32 is fixed to an inner circumferential surface of the housing 14. The stator 32 includes a yoke in which a plurality of slots is formed. The plurality of slots is disposed at an interval in the circumferential direction of the stator 32. The front end surfaces of the plurality of slots face the outer circumferential surface of the rotor 22 with a small gap (however, the gap is not shown in FIG. 1) interposed. A coil is wound around each slot. The connector terminal 50 is connected to each coil.

The pump portion 40 includes an impeller 44 having an approximately disk shape and pump casings 38 and 42 that accommodate the impeller 44. A group of recesses 44a is formed on an upper surface of the impeller 44 along an outer circumferential edge thereof. A group of recesses 44b is formed on a lower surface of the impeller 44 along the outer circumferential edge thereof. A through-hole is formed at the center of the impeller 44, and the shaft 24 is fitted to the through-hole so as not to be rotatable relative to the through-hole. Thus, when the shaft 24 rotates, the impeller 36 also rotates.

The pump casings 38 and 42 are fixed to the lower end of the housing 14 in a state where the impeller 44 is accommodated in the pump casings 38 and 42. The pump casings 38 and 42 include a discharge-side casing 38 and an intake-side casing 42. A groove 38a is formed in a portion of the discharge-side casing 38 that faces the group of recesses 44a on the upper surface of the impeller 44. The groove 38a is formed in an approximately C-shape and extends from an upstream end to a downstream end along the rotation direction of the impeller 44. A discharge port (not shown) that extends from the downstream end of the groove 38a to the upper surface of the discharge-side casing 38 is formed in the discharge-side casing 38. The discharge port allows the inside of the pump casing to communicate with the outside (i.e., the inner space of the motor portion 20).

A groove 42a is formed in a portion of the intake-side casing 42 that faces the group of recesses 44b on the lower surface of the impeller 44. Similarly to the groove 38a, the groove 42a is formed in an approximately C-shape and extends from the upstream end to the downstream side along the rotation direction of the impeller 44. An intake port 46 that extends from the lower surface of the intake-side casing 42 to the upstream end of the groove 42a is formed in the intake-side casing 42. The intake port 46 allows the inside of the pump casings 38 and 42 to communicate with the outside (the outside of the fuel pump 10).

In the fuel pump 10 described above, when an electric power is supplied to the coil of the stator 32 through the connector terminal 50, the rotor 22 rotates. When the impeller 44 rotates with rotation of the rotor 22, fuel is sucked into the pump casing from the intake port 46 of the intake-side casing 42. The fuel sucked into the pump casings 38 and 42 flows from the upstream side to the downstream side through pump channels 42a, 44b, 44a, and 38a while being pressurized. The fuel pressurized in the pump channels is delivered into the housing 14 of the motor portion 20 through the discharge port. The fuel delivered into the housing 14 flows upward within the housing 14 and is discharged from the discharge port 18 of the motor cover 16.

Figure 2:
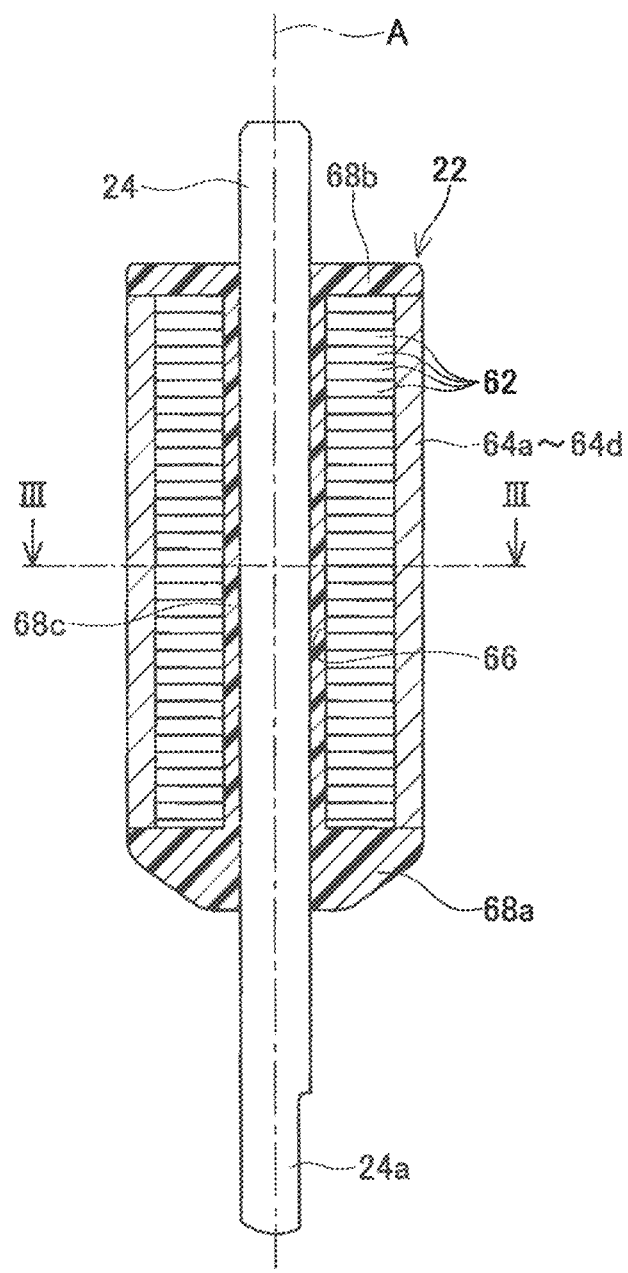
FIG. 2 shows a longitudinal cross-sectional view of a rotor.
Figure 3:
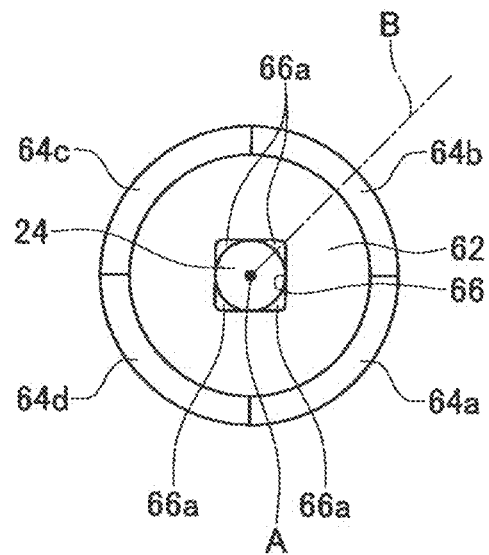
FIG. 3 shows a cross-sectional view along line III-III in FIG. 2.

Next, the configuration of the rotor 22 will be described in detail. As shown in FIGS. 2 and 3, the rotor 22 includes the shaft 24, the back yoke 62 fixed on the shaft 24, and permanent magnets 64a to 64d disposed on the outer circumferential surface of the back yoke 62.

The shaft 24 extends through the back yoke 62, and an engagement portion 24a that engages with a thorough-hole of the impeller 44 is formed on a lower end of the shaft 24. A cross-section (hereinafter sometimes simply referred to as a perpendicular cross-section) of the engagement portion 24a perpendicular to a shaft axis line A has an approximately D-shape. Thus, when the engagement portion 24a of the shaft 24 engages with the through-hole of the impeller 44, the shaft 24 and the impeller 44 rotate integrally. In portions other than the engagement portion 24a, the perpendicular cross-section of the shaft 24 has a circular outer shape (see FIG. 3).

The back yoke 62 includes a plurality of core plates 62 that is stacked in an axial direction. Each core plate 62 is formed of a magnetic steel plate. As shown in FIG. 3, a through-hole 66 is formed at the center of each core plate 62. Due to the through-hole 66 formed in each core plate 62, the through-holes 66 that extend in the axial direction are formed in the back yoke 62 (see FIG. 2). The shaft 24 is press-fitted to the through-hole 66 of the back yoke 62. As shown in FIG. 3, the perpendicular cross-section of the through-hole 66 has a rectangular shape, and the perpendicular cross-section of the shaft 24 has a circular shape. Thus, when the shaft 24 is press-fitted to the through-hole 66 of the back yoke 62, four communication holes 66a are formed between the outer circumferential surface of the shaft 24 and the inner circumferential surface of the through-hole 66 of the core plate 62. Each communication hole 66a extends in parallel to the shaft axis line and passes through the back yoke 62.

The permanent magnets 64a to 64d are disposed on the outer circumferential surfaces of the back yoke 62. Each of the permanent magnets 64a to 64d extends from the upper end to the lower end of the back yoke 62, and a perpendicular cross-section thereof has an arc shape (see FIG. 3). Thus, when the permanent magnets 64a to 64d are disposed on the outer circumferential surfaces of the back yoke 62, the respective permanent magnets 64a to 64d make contact with the adjacent permanent magnets and form cylindrical permanent magnet portions. The permanent magnets 64a to 64d are alternately magnetized in different directions. For example, the permanent magnets 64a and 64c are magnetized so that the outer circumferential surface becomes the N-pole, and the inner circumferential surface becomes the S-pole. Moreover, the permanent magnets 64b and 64d are magnetized so that the outer circumferential surface becomes the S-pole, and the inner circumferential surface becomes the N-pole. As is clear from FIG. 3, in a cross-section perpendicular to the shaft axis line A, each communication hole 66a is positioned on a line B that connects the center in the circumferential direction of the permanent magnets 64a to 64d and the shaft axis line A.

As shown in FIG. 2, a first resin portion 68a is formed on the lower surface of the back yoke 62 and the lower surfaces of the permanent magnets 64a to 64d. Moreover, a second resin portion 68b is formed on the upper surface of the back yoke 62 and the upper surfaces of the permanent magnets 64a to 64d. The first and second resin portions 68a and 68b are formed so as to extend over the back yoke 62 and the permanent magnets 64a to 64d, whereby the permanent magnets 64a to 64d are fixed to the back yoke 62.

Moreover a third resin portion 68c is formed in each communication hole 66a that is formed between the shaft 24 and the back yoke 62. Since the communication holes 66a pass through the back yoke 62 in the shaft axis direction, the lower ends of the third resin portions 68c are connected to the first resin portion 68a, and the upper ends of the third resin portions 68c are connected to the second resin portion 68b. That is, the third resin portions 68c connect the first and second resin portions 68a and 68b.

In the fuel pump 10 according to the present embodiment, by forming the communication hole 66a in the rotor 22, the first, second, and third resin portions 68a, 68b, and 68c can be integrally formed by a single resin-molding process. This will be described in detail by way of an example of a method of manufacturing the rotor 22. When the rotor 22 is manufactured, first, the shaft 24 is press-fitted to the through-hole 66 of the back yoke 62. Subsequently, in a state where the permanent magnets 64a to 64d are disposed on the outer circumferential surface of the back yoke 62, the shaft 24, the back yoke 62, and the permanent magnets 64a to 64d are disposed in a mold. In order to improve mobility of a resin in the mold, gates are formed on the upper or lower surface side of the back yoke 62 in the mold. Moreover, a resin is injected into the mold to form the respective resin portions 68a, 68b, and 68c. For example, when the gates are formed on the lower surface side of the back yoke 62, the resin injected into the mold is flowed into a space for forming the first resin portion 68a. The resin flows into the space for forming the first resin portion 68a so that the space is filled with the resin. The resin flows into a space for forming the second resin portion 68b through the communication hole 66a so that the space is filled with the resin. As a result, the first, second, and third resin portions 68a, 68b, and 68c are integrally formed by a single resin-molding process.

In the fuel pump 10 described above, the shaft 24 is fixed to the back yoke 62 by press-fitting. Thus, centrifugal force that acts on the back yoke 62 and the permanent magnets 64a to 64d during rotation of the rotor 22 acts directly on the shaft 24, and is not applied to the third resin portions 68c. Thus, the communication hole 66a may only need to function as a resin flow path when the first and second resin portions 68a and 68b are formed. As a result, it is possible to form the third resin portions 68c to be thin and to suppress the size of the rotor 22 from increasing. Further, since the shaft 24 and the back yoke 62 are fixed by press-fitting, the shaft 24 and the back yoke 62 can be fixed more reliably than holding the same using the resin portion. Furthermore, it is possible to suppress the size of the fuel pump 10 from increasing.

Moreover, in the fuel pump 10 described above, since it is sufficient to flow a resin into the communication hole 66a when forming the first and second resin portions 68a and 68b, it is not necessary to form a resin flow path at the outer sides of the permanent magnets 64a to 64d. As a result, a resin portion is not formed on the outer circumferential surfaces of the permanent magnets 64a to 64d, and the gap between the permanent magnets 64a to 64d and the stator 32 can be decreased. Further, since it is not necessary to flow a resin into a space between the adjacent permanent magnets, the adjacent permanent magnets can make contact with each other, and the angle between the permanent magnets 64a to 64d can be increased. Thus, it is possible to improve a motor performance and to improve pumping efficiency of the fuel pump 10.

Furthermore, in the cross-section perpendicular to the shaft axis line A, each communication hole 66a is positioned on a line B that connects a center of the corresponding one of the permanent magnets 64a to 64d in the circumferential direction and the shaft axis line A (see FIG. 3). That is, the communication holes 66a are disposed at positions furthest from the boundary line between the adjacent permanent magnets (that is, between the permanent magnets 64a and 64b, 64b and 64c, 64c and 64d, or 64d and 64a). Thus, a magnetic flux area in which a magnetic flux flowing between the adjacent permanent magnets passes through the back yoke 62 is prevented from decreasing due to the communication holes 66a. As a result, an increase in the magnetic resistance due to the communication holes 66a is suppressed, and motor efficiency is suppressed from decreasing.

Figure 4:
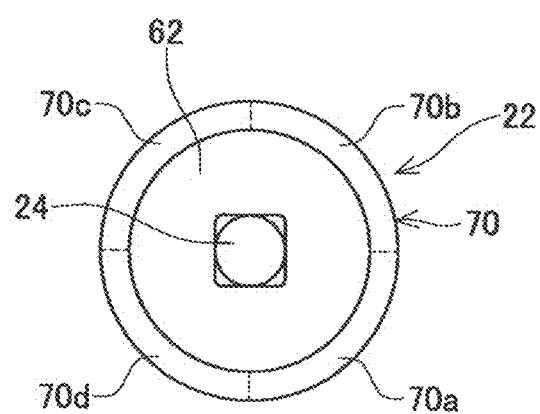
FIG. 4 shows a cross-sectional view (corresponding to the cross-section shown in FIG. 3) according to a modification of a rotor shown in FIG. 2.

In the first embodiment described above, although a plurality of permanent magnets 64a to 64d is disposed on the outer circumferential surface of the back yoke 62, as shown in FIG. 4, one cylindrical permanent magnet 70 may be disposed on the outer circumferential surface of the back yoke 62. In this configuration, the permanent magnet 70 may be magnetically divided into a plurality of areas 70a to 70d in the circumferential direction, and the respective areas 70a to 70d may be alternately magnetized in different directions.

Figure 5:
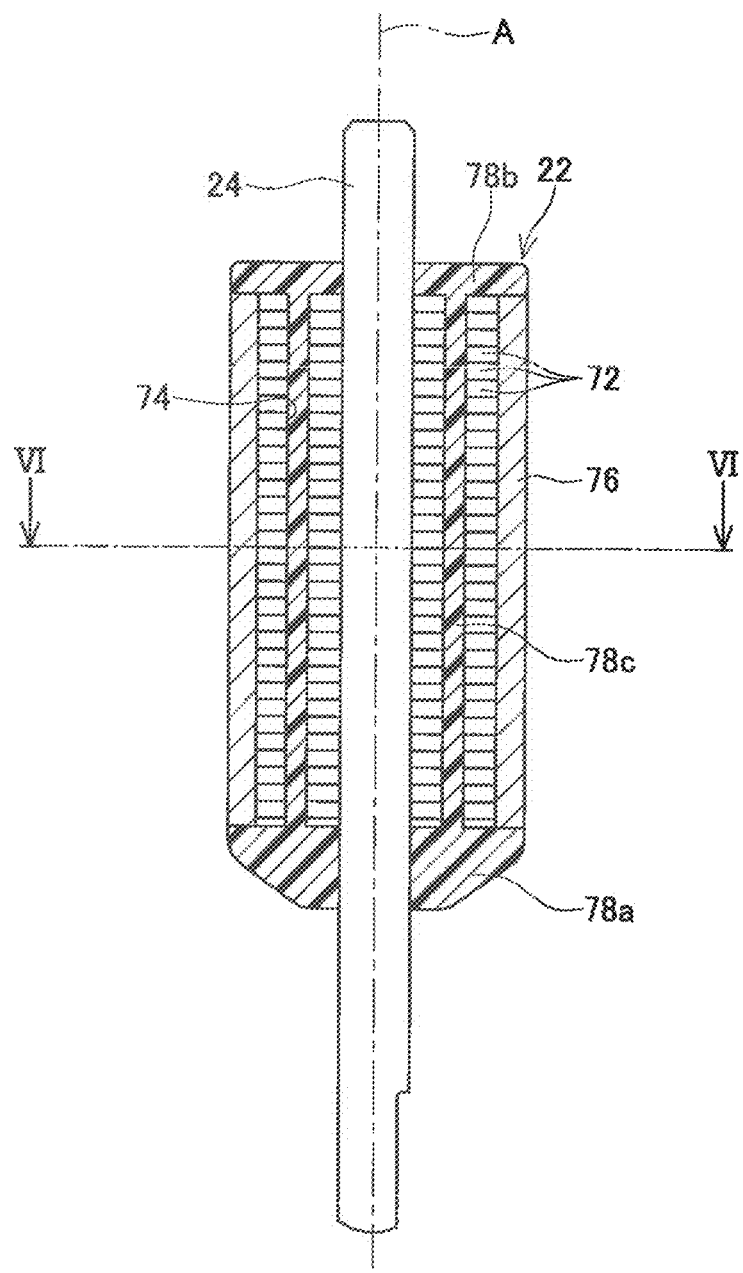
FIG. 5 shows a longitudinal cross-sectional view of a rotor according to another modification.
Figure 6:
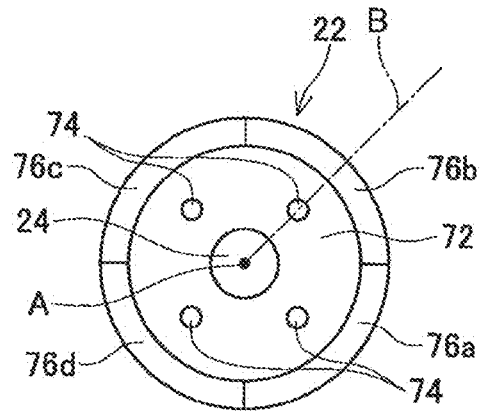
FIG. 6 shows a cross-sectional view along line VI-VI in FIG. 5.

Moreover, in the first embodiment described above, although the communication hole 66a is formed between the back yoke 62 and the shaft 24, as shown in FIGS. 5 and 6, communication holes 74 may be formed in back yoke 72. That is, a partial communication hole that passes in the axial direction may be formed in each core plate 72 that constitutes the back yoke 72, and the partial, communication holes of the respective core plates 72 may form the communication hole 74. According to this configuration, since first and second resin portions 78a and 78b are connected by third resin portions 78c that are formed in the communication holes 74, it is possible to form these resin portions 78a, 78b, and 78c integrally.

In the example shown in FIGS. 5 and 6, in a cross-section perpendicular to the shaft axis line A, each communication hole 74 is positioned on a line B that connects the center of the corresponding one of the permanent magnets 76a to 76d in the circumferential direction and the shaft axis line A (see FIG. 6). Thus, a magnetic flux area in which a magnetic flux passes through the back yoke 72 is prevented from decreasing due to the communication holes 74. Moreover, since the respective core plates 72 are thin, it is possible to easily form the partial communication holes in the respective core plates 72. Further, through-hole of the back yoke 72 to which the shaft 24 is press-fitted has a circular perpendicular cross-section and makes contact with the outer circumferential surface of the shaft 24 with the entire circumference. Thus, it is possible to reliably fix the shaft 24 to the back yoke 72.

Figure 7:
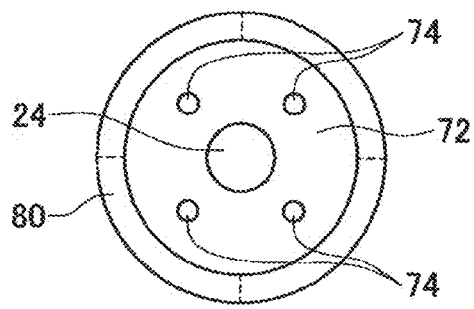
FIG. 7 shows a cross-sectional view (corresponding to the cross-section shown in FIG. 6) according to a modification of the rotor shown in FIG. 5.

In the example shown in FIGS. 5 and 6, although four permanent magnets are disposed on the outer circumferential surfaces of the back yoke 72, as shown in FIG. 7, one cylindrical permanent magnet 80 may be disposed on the outer circumferential surface of the back yoke 72.

Figure 8:
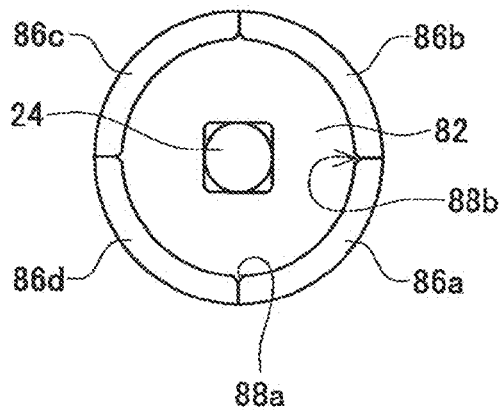
FIG. 8 shows a cross-sectional view (corresponding to the cross-section shown in FIG. 6) according to another modification of the rotor shown in FIG. 5.

Moreover, the rotor 22 according to the first embodiment described above may be modified to employ a configuration as shown in FIG. 8. In the rotor shown in FIG. 8, a convex portion 88a is formed on the outer circumferential surfaces of the back yoke 82, and a concave portion 88b is formed at the boundaries between the respective permanent magnets 86a to 86d. When the permanent magnets 86a to 86d are disposed on the outer circumferential surfaces of the back yoke 82, the convex portions 88a of the back yoke 82 engage with the concave portions 88b of the permanent magnets 86a to 86d. According to this configuration, since the permanent magnets 86a to 86d are restricted from rotating around the shaft axis line in relation to the back yoke 82, the permanent magnets 86a to 86d can be positioned at appropriate positions in relation to the back yoke 82.

Figure 9:
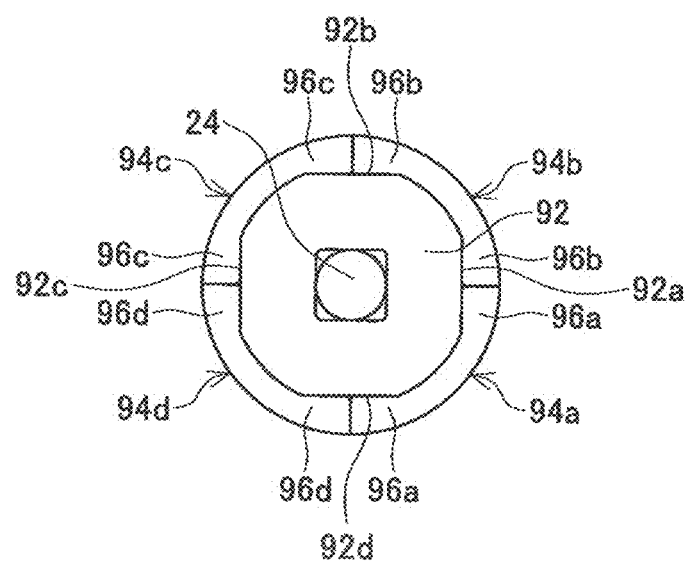
FIG. 9 shows a cross-sectional view (corresponding to the cross-section shown in FIG. 6) according to another modification of the rotor shown in FIG. 5.

In the rotor shown in FIG. 9, similarly to the rotor shown in FIG. 8, it is possible to restrict the permanent magnets 94a to 94d from rotating around the shaft axis line in relation to the back yoke 82. That is, in the rotor shown in FIG. 9, a plurality of chamfered portions 92a to 92d is formed on the outer circumferential surfaces of the back yoke 92, and both end portions 96a to 96d of the respective permanent magnets 86a to 86d have shapes corresponding to the chamfered portions 92a to 92d. According to this configuration, it is possible to restrict the permanent magnets 94a to 94d from rotating around the shaft axis line in relation to the back yoke 92. The chamfered portions 92a to 94d may be formed at any position in the rotation direction.

Moreover, in the rotor according to the first embodiment, although the outer circumferential surfaces of the permanent magnets 64a to 64d are not covered with a resin, the present teaching is not limited to such an embodiment, the rotor may further include a fourth resin portion that covers the outer circumferential surfaces of the permanent magnets, and the first to fourth resin portions may be integrally formed. Further, the rotor may include a structure that aligns the core plates that constitute the back yoke. For example, when a convex portion is formed on the upper surface of the core plate and a concave portion is formed on the lower surface of the core plate to stack the core plates, the core plates are stacked so that the convex portion on the upper surface of the core plate engages with the concave portion on the lower surface of the core plate. By doing so, a positional shift between the core plates is prevented, and handling of the core plates becomes easy.

(Second Embodiment)

In a fuel pump according to a second embodiment, the rotor 22 of the fuel pump 10 according to the first embodiment is modified. Thus, in this embodiment, the configuration of only the rotor which is different from that of the fuel pump 10 according to the first embodiment will be described.

Figure 10:
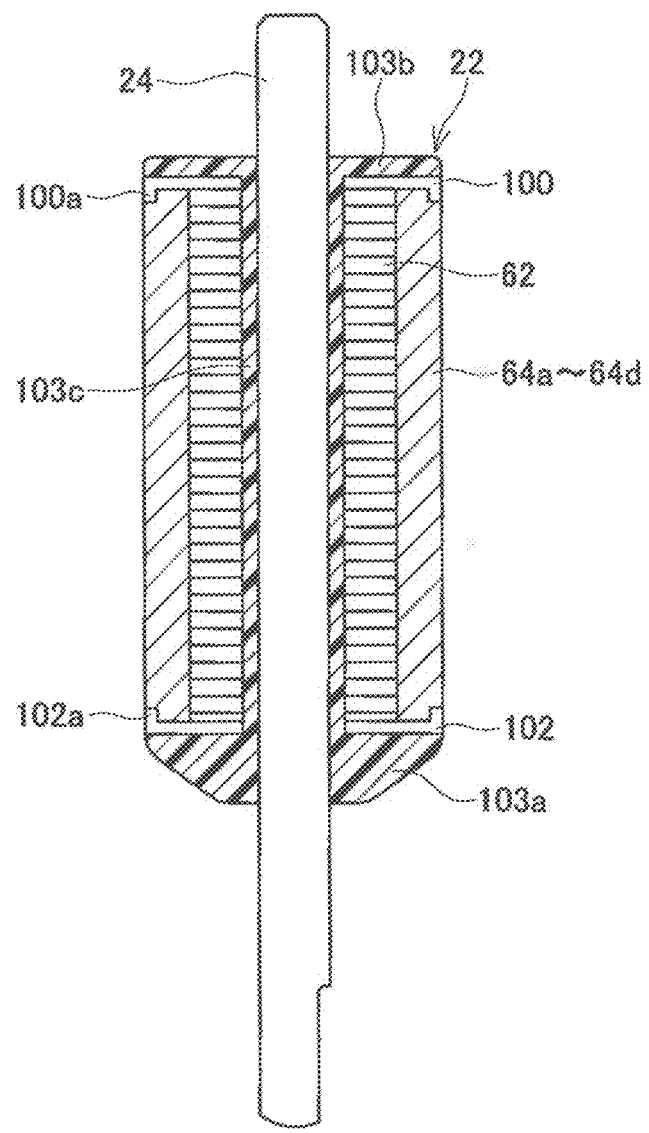
FIG. 10 shows a longitudinal cross-sectional view of a rotor according to a second embodiment.

As shown in FIG. 10, in the rotor 22 according to the second embodiment, restriction plates 100 and 102 are arranged on the upper and lower ends of the back yoke 62 and the permanent magnets 64a to 64d, respectively. The same through-hole as the through-hole 66 of the core plates 62 is formed at the center of each of the restriction plates 100 and 102. Thus, when the shaft 24 is press-fitted to the through-holes of the restriction plates 100 and 102, a communication hole is also formed between the shaft 24 and the restriction plates 100 and 102. As a result, the restriction plates 100 and 102 can be fixed to the shaft 24, and first, second, and third resin portions 103a, 103b, and 103c can be formed integrally.

Engagement pieces 100a and 102a are formed on the outer circumferential edges of the restriction plates 100 and 102. A plurality of engagement pieces 100a and 102a is formed at an interval in the circumferential direction. The respective engagement pieces 100a and 102a engage with the permanent magnets 64a to 64d. Due to this, the permanent magnets 64a to 64d are restricted from rotating in relation to the back yoke 62 and moving in the shaft axis direction. Thus, it is possible to prevent a positional shift of the permanent magnets 64a to 64d in relation to the back yoke 62 due to a resin pressure when forming the resin portions 103a, 103b, and 103c.

Figure 11:
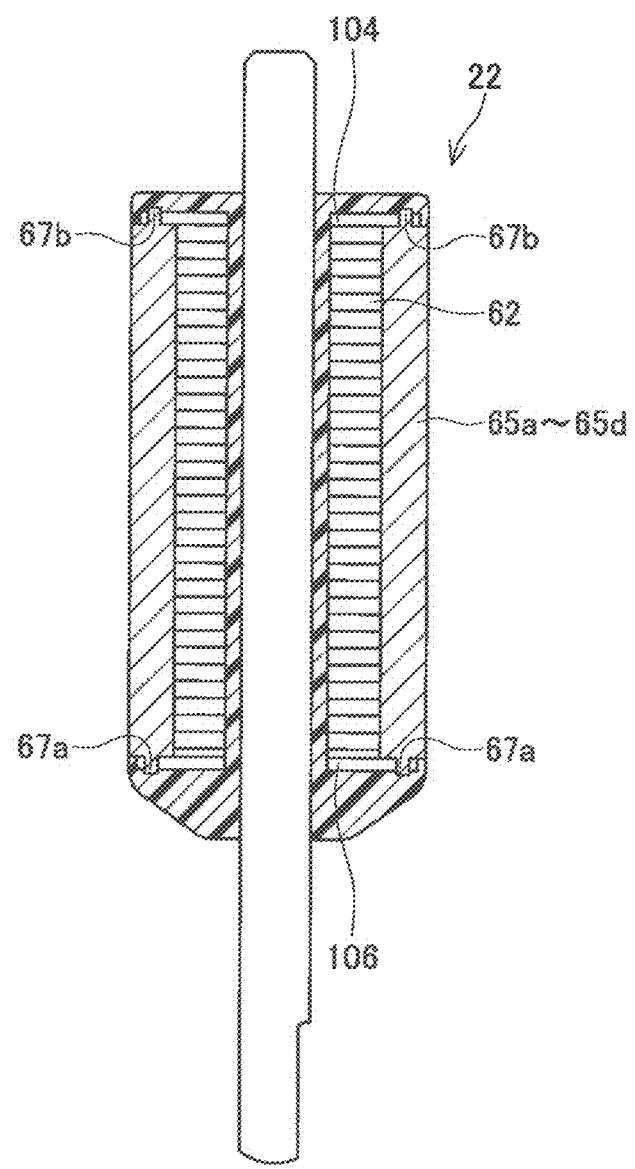
FIG. 11 shows a longitudinal cross-sectional view of a rotor according to a modification of the second embodiment.

In the rotor 22 according to the second embodiment, although the engagement pieces 100a and 102a are formed in the restriction plates 100 and 102, the present teaching is not limited to such an embodiment, the rotor 22 may have a configuration as shown in FIG. 11. In the rotor 22 shown in FIG. 11, engagement pieces 67a and 67b are formed on the upper and lower edges of magnets 65a to 65d, and these engagement pieces 67a and 67b engage with restriction plates 106 and 104. According to such a configuration, it is also possible to prevent a positional shift of the permanent magnets 65a to 65d in relation to the back yoke 62. In this embodiment, each of the restriction plates 100, 102, 104 and 106 is an example of the "magnet holder".

In the example shown in FIGS. 10 and 11, although the engagement pieces 100a and 102a or 67a and 67b are formed in a portion of the circumference, the present teaching is not limited to such an embodiment, and the engagement piece may be formed on the entire circumference of the restriction plates or the permanent magnets. According to such a configuration, it is also possible to ideally prevent a positional shift of the permanent magnets in relation to the back yoke.

(Third Embodiment)

In a fuel pump according to a third embodiment, the rotor 22 of the fuel pump 10 according to the first embodiment is modified. Thus, in this embodiment, the configuration of only the rotor which is different from that of the fuel pump 10 according to the first embodiment will be described.

Figure 12:
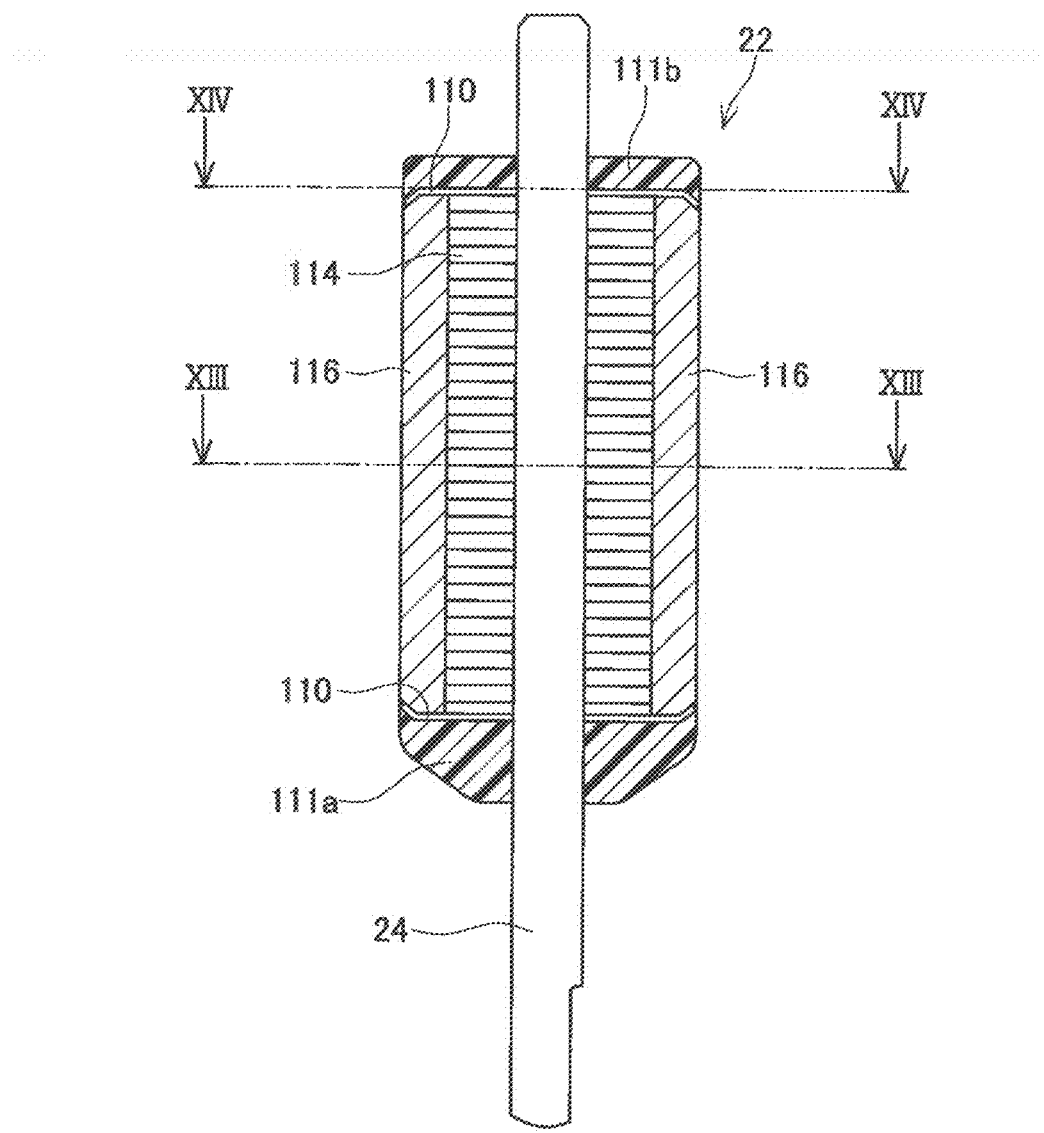
FIG. 12 shows a longitudinal cross-sectional view of a rotor according to a third embodiment.
Figure 13:
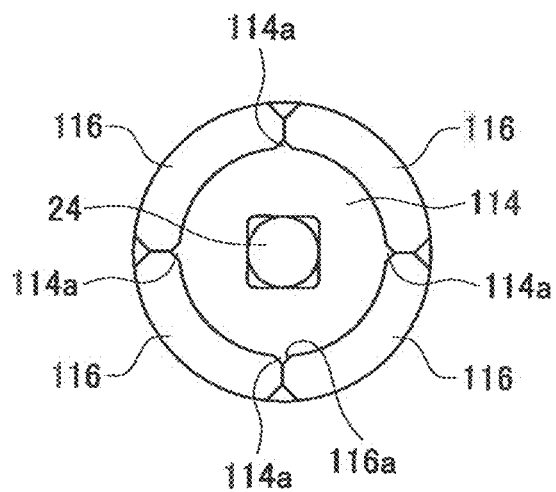
FIG. 13 shows a cross-sectional view along line XIII-XIII FIG. 12.
Figure 14:
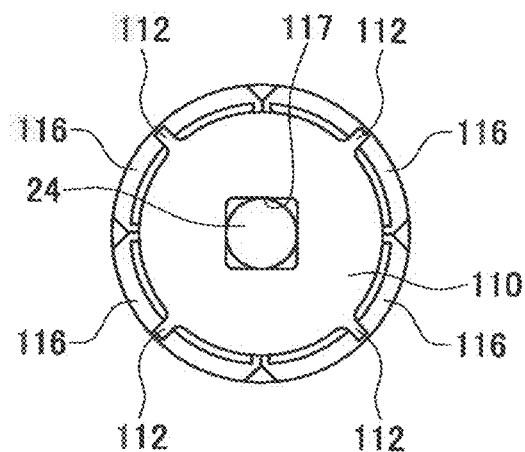
FIG. 14 shows a cross-sectional view along line XIV-XIV in FIG. 12.

In the rotor 22 according to the third embodiment, as shown in FIGS. 12 to 14, restriction plates 110 are arranged on the upper and lower ends of back yoke 114 and permanent magnets 116. As shown in FIG. 13, four permanent magnets 116 are disposed on the outer circumferential surfaces of the back yoke 114. A concave portion 116a is formed at the boundary between the adjacent permanent magnets 116, and a convex portion 114a formed on the outer circumferential surface of the back yoke 114 engages with the concave portion 116a. Due to this, rotation of the permanent magnets 116 in relation to the back yoke 114 is restricted. In addition, the convex portion 114a is an example of the "circumferential position regulating portion". Similarly to the first embodiment, a through-hole having a rectangular perpendicular cross-section is formed at the center of each of the back yoke 114, and the shaft 24 is press-fitted to the through-hole. Thus, in the rotor 22 according to the third embodiment, a communication hole that extends in parallel to the shaft axis is also formed between the shaft 24 and the back yoke 114.

As shown in FIG. 14, the same through-hole 117 as the through-hole of the back yoke 114 is formed at the center of the restriction plate 110. That is, a cross-section of the through-hole 117 perpendicular to the shaft axis has a rectangular outer shape, and the shaft 24 is press-fitted to the through-hole 117. Moreover, a communication hole that communicates with the communication hole that is formed between the back yoke 114 and the shaft 24 is formed between the restriction plate 110 and the shaft 24. Since the shaft 24 is press-fitted to the through-hole 117, a positional shift of the restriction plate 110 in relation to the shaft 24 is prevented. Moreover, since the communication hole that passes in the shaft axis direction is formed in the back yoke 114 and the restriction plate 110, the resin portions 111a and 111b formed on both ends of the shaft 24 can be formed integrally with a resin portion that is formed in the communication hole (however, the resin portion is not shown because FIG. 12 shows a cross-section of a portion where the communication hole is not formed, and the resin portion is not shown in FIGS. 13 and 14).

As shown in FIG. 14, four engagement pieces 112 are formed on an outer circumferential edge of the restriction plate 110. The four engagement pieces 112 are disposed at an equal interval in the circumferential direction. Each engagement piece 112 engages with a central portion in the circumferential direction of the permanent magnet 116. Due to this, the permanent magnet 116 is restricted from rotating around the shaft axis in relation to the back yoke 114 and moving in the shaft axis direction. Thus, it is possible to more reliably prevent a positional shift of the permanent magnets 116 in relation to the back yoke 114 due to a resin pressure when forming the resin portions 111a and 111b.

Figure 15:
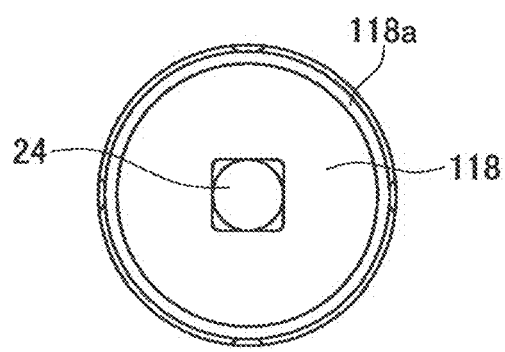
FIG. 15 shows a cross-sectional view (corresponding to the cross-section shown in FIG. 12) of a rotor according to a modification of the third embodiment.

The restriction plates disposed on the upper and lower ends of the back yoke are not limited to those shown in FIG. 14, and a restriction plate 118 shown in FIG. 15 may be used. In the restriction plate 118 shown in FIG. 15, an engagement wall 118a is formed on the entire outer circumferential edge thereof, and the permanent magnet engages with the engagement wall 118a. Thus, it is possible to prevent a positional shift of the permanent magnet more reliably. In this embodiment, each of the restriction plates 110, 118 is an example of the "magnet holder".

(Fourth Embodiment)

In a fuel pump according to a fourth embodiment, the rotor 22 of the fuel pump 10 according to the first embodiment is modified. Thus, in this embodiment, the configuration of only the rotor which is different from that of the fuel pump 10 according to the first embodiment will be described.

Figure 16:
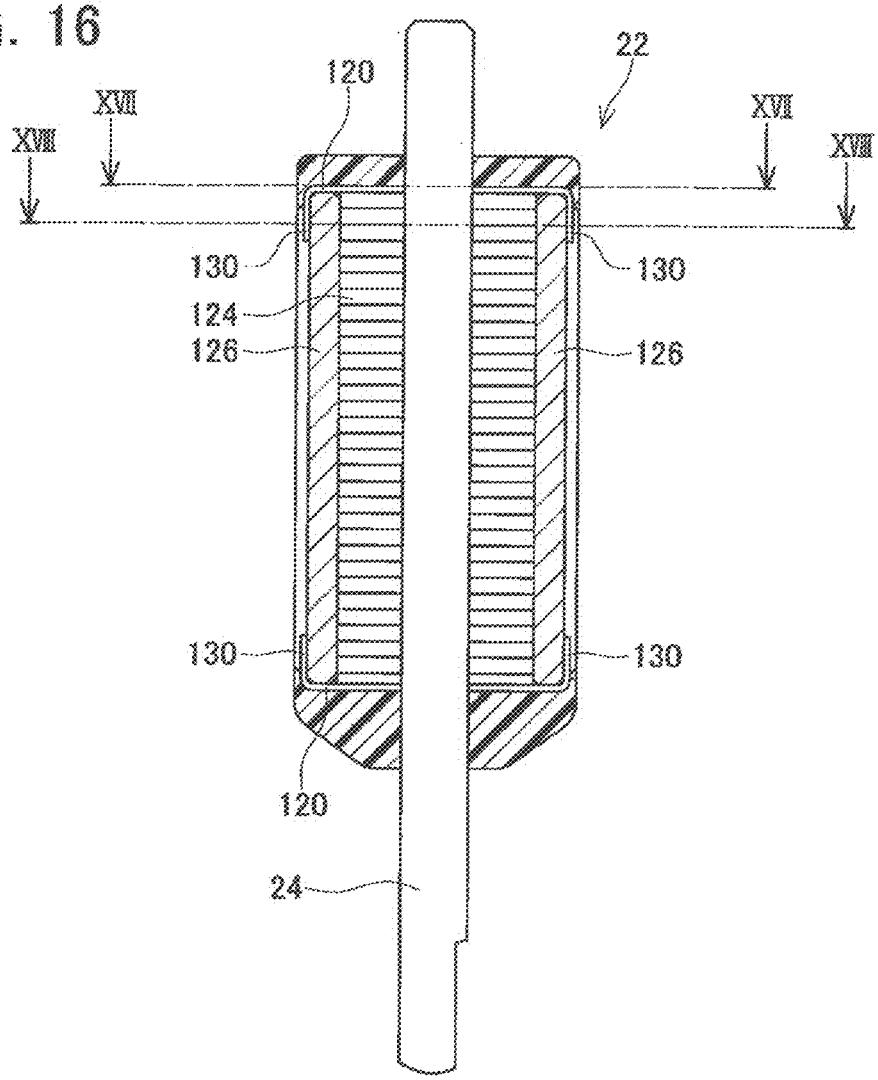
FIG. 16 shows a longitudinal cross-sectional view of a rotor according to a fourth embodiment.
Figure 17:
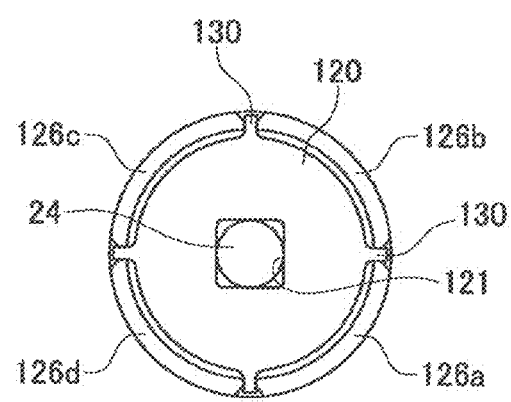
FIG. 17 shows a cross-sectional view along line XVII-XVII in FIG. 16.
Figure 18:
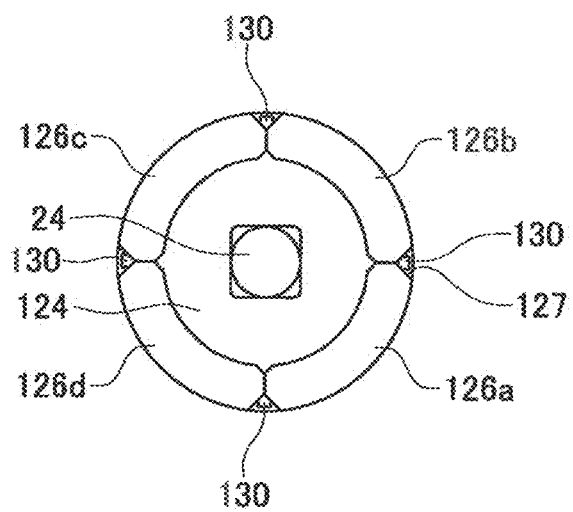
FIG. 18 shows a cross-sectional view along line XVIII-XVIII in FIG. 16.

As shown in FIGS. 16 to 18, the rotor 22 according to the fourth embodiment also has approximately the same configuration as the rotor 22 according to the third embodiment. However, the rotor 22 according to the fourth embodiment includes restriction plates 120 that have a different configuration from that of the third embodiment. That is, the restriction plates 120 are arranged on the upper and lower ends of back yoke 124 and permanent magnets 126 (126a to 126d). As shown in FIG. 17, a through-hole 121 of which a cross-section perpendicular to the shaft axis has a rectangular shape is formed at the center of each of the restriction plates 120, and the shaft 24 is press-fitted to the through-hole 121. Moreover, four engagement pieces 130 are formed on the outer circumferential edges of the restriction plates 120. The respective engagement pieces 130 engage with the permanent magnets 126a to 126d at the boundaries between the adjacent permanent magnets (that is, the boundaries between the permanent magnets 126a and 126b, 126b and 126c, 126c and 126d, and 126d and 126a). Specifically, as shown in FIG. 18, at the boundaries between the adjacent permanent magnets (that is, the boundaries between the permanent magnets 126a and 126b, 126b and 126c, 126c and 126d, and 126d and 126a), a concave portion 127 is formed at the outer circumferences of the boundaries. Each engagement piece 130 is bent upward or downward and makes contact with the side surfaces of the permanent magnets 126a to 126d in the concave portions 127.

In the fourth embodiment, the restriction plates 120 are disposed on the upper and lower ends of the back yoke 124 and the permanent magnets 126, and a positional shift of the back yoke 124 in relation to the permanent magnets 126 is restricted by the restriction plates 120. Due to this, it is possible to form a resin portion in a state where the permanent magnets 126 are positioned at appropriate positions in relation to the back yoke 124. Moreover, the engagement pieces 130 of the restriction plates 120 make contact with the permanent magnets 126 at the boundaries between the permanent magnets 126a to 126d. Thus, it is possible to suppress the engagement pieces 130 from affecting on the magnetic field that is generated by the permanent magnets 126a to 126d. As a result, it is possible to suppress a decrease in the motor efficiency and to suppress a decrease in the pumping efficiency. In addition, the restriction plate 120 is an example of the "magnet holder".

Figure 19:
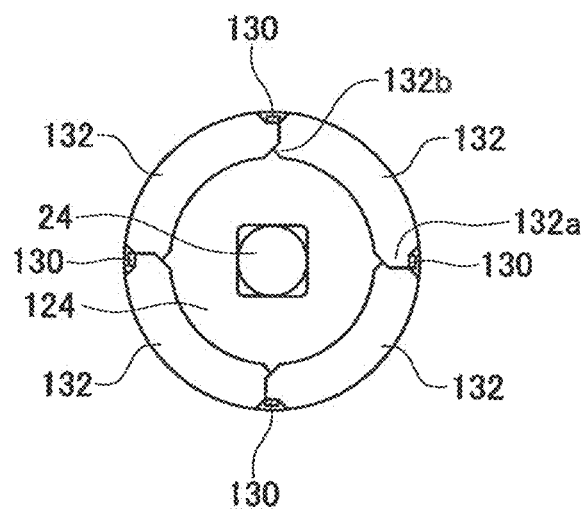
FIG. 19 shows a cross-sectional view (corresponding to the cross-section shown in FIG. 18) of a rotor according to a modification of the fourth embodiment.

A permanent magnet 132 shown in FIG. 19 may be used in the rotor 22 according to the fourth embodiment. As shown in FIG. 19, a contacting portion 132a that makes contact with the engagement piece 130 of the restriction plate 120 is formed on one end of the permanent magnet 132. On the other hand, a contacting portion 132b that makes contact with the contacting portion 132a of the adjacent permanent magnet 132 from the inner side is formed on the other end of the permanent magnet 132. In the example shown in FIG. 19, the engagement piece 130 makes contact with only one end of the permanent magnet 132, and a contacting area between the engagement piece 130 and the permanent magnet 132 can be increased. Thus, one end of the permanent magnet 132 can be stably held by the restriction plate 120. Further, the other end of the adjacent permanent magnet 132 engages with one end of the adjacent permanent magnet, and these ends can be pressed toward the inner side by the engagement piece 130. Thus, it is possible to ideally prevent the permanent magnet 132 from dropping when the rotor rotates.

(Fifth Embodiment)

In a fuel pump according to a fifth embodiment, the rotor 22 of the fuel pump 10 according to the first embodiment is modified. Thus, in this embodiment, the configuration of only the rotor which is different from that of the fuel pump 10 according to the first embodiment will be described.

Figure 20:
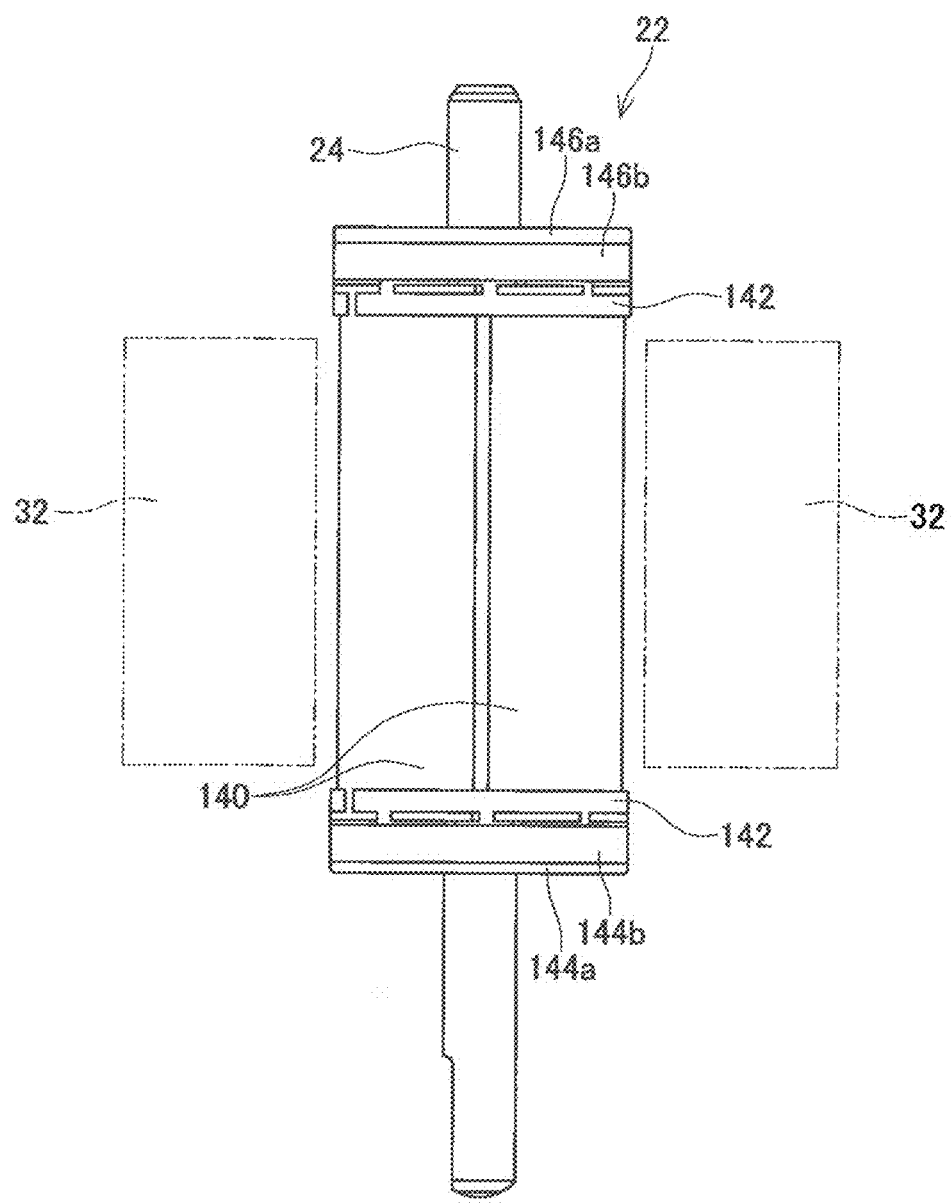
FIG. 20 shows a front view of a rotor according to a fifth embodiment.
Figure 21:
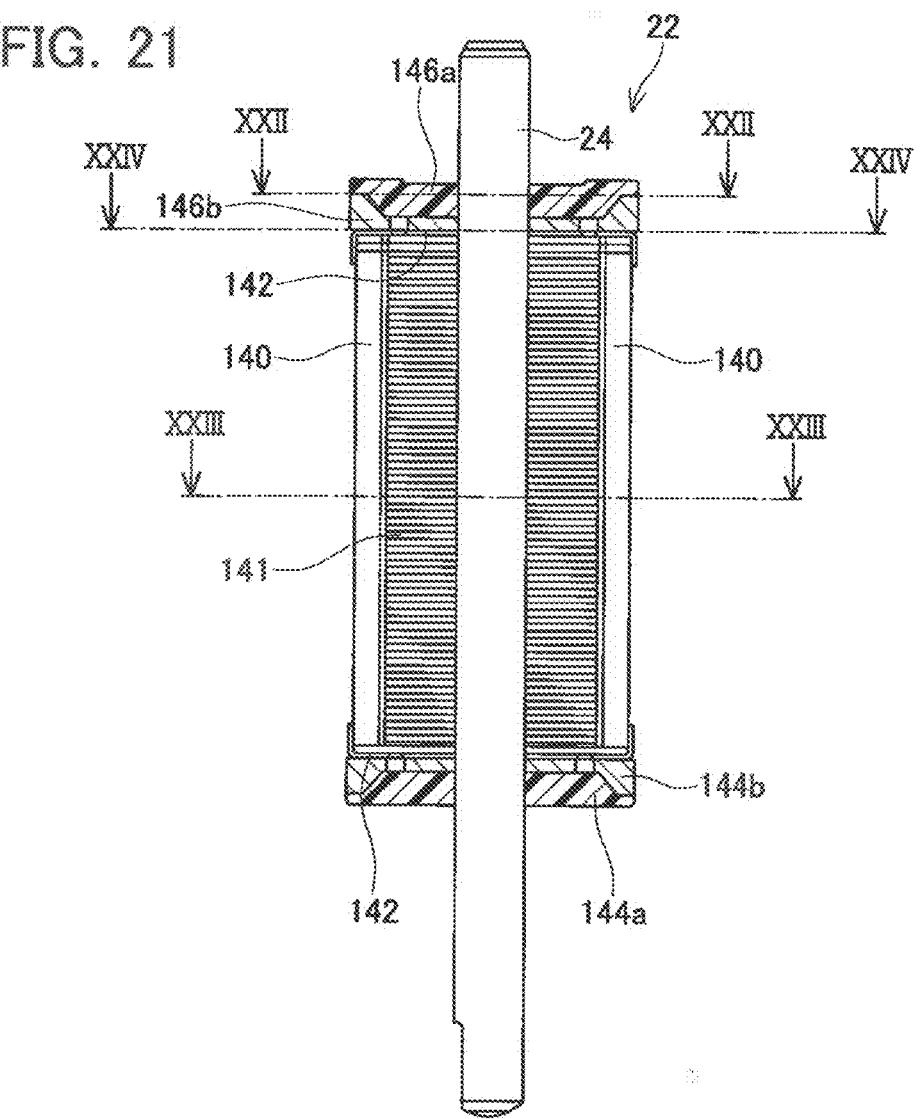
FIG. 21 shows a longitudinal cross-sectional view of the rotor shown in FIG. 20.

As shown in FIGS. 20 and 21, in the rotor 22 according to the fifth embodiment, restriction plates 142 and pressing members 144b and 146b are disposed on the upper and lower ends of back yoke 141 and permanent magnets 140. Resin portions 144a and 146a are formed on the lower surface of the pressing member 144b and the upper surface of the pressing member 146b, respectively. As is clear from FIG. 20, the outer diameters of the restriction plates 142, the pressing members 144b and 146b, and the resin portions 144a and 146a are smaller than the inner diameter of the stator 32. Thus, the rotor 22 can be inserted in the stator 32.

Figure 23:
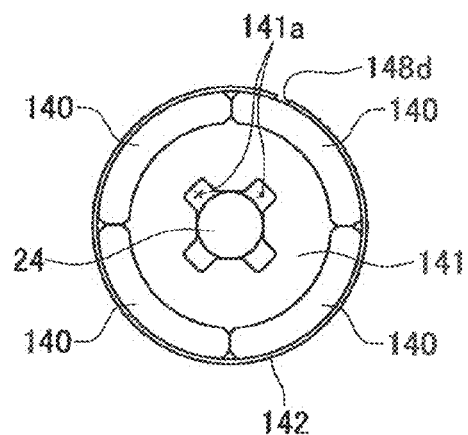
FIG. 23 shows a cross-sectional view along line XXIII-XXIII in FIG. 21.

As shown in FIG. 23, the restriction plate 142 is a plate member in which a portion 148d in the circumferential direction is open, and is configured to press the permanent magnets 140 toward the back yoke 141 due to an elastic force thereof. Thus, before the resin portions 144a and 146a are formed, the back yoke 141 and the permanent magnets 140 can be treated as an integral body. The shaft 24 is press-fitted to a through-hole of the back yoke 141, and communication holes 141a are formed between the shaft 24 and the back yoke 141. Similarly to the above-described embodiment, a resin portion (not shown) that connects the resin portions 144a and 146b is formed in the communication hole 141a.

Figure 24:
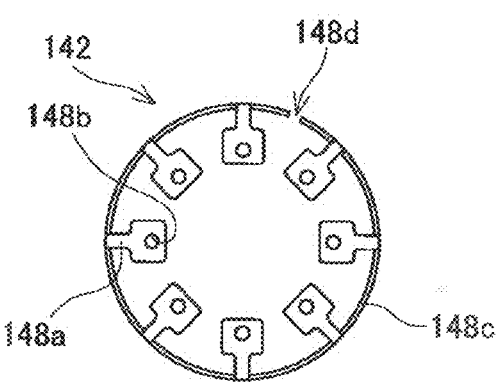
FIG. 24 shows a cross-sectional view along line XXIV-XXIV in FIG. 21 (a back yoke is not shown).

As shown in FIG. 24, the restriction plate 142 includes a ring-shaped portion 148c that makes contact with the outer circumferential surface of the permanent magnet 140 and a plurality of projecting pieces 148a of which one set of ends are connected to the ring-shaped portion 148c. One portion 148*d* in the circumferential direction is open to the ring-shaped portion 148*c*, and the dimension of the ring-shaped portion 148*c* can be increased due to an elastic force thereof. Thus, even when the thicknesses of the permanent magnets 140 fluctuate, the ring-shaped portion 148*c* can follow the fluctuation. The plurality of projecting pieces 148*a* is bent in relation to the ring-shaped portion 148*c* and is disposed at an equal interval in the circumferential direction. A through-hole 148*b* is formed in the front end portions of the plurality of projecting pieces 148*a*.

The pressing members 144*b* and 146*b* are members for pressing the restriction plate 142 toward the permanent magnet 140 and adjusting a weight balance of the rotor 22. The pressing members 144*b* and 146*b* can be formed from a metal material such as a stainless steel, for example. Since the pressing members 144*b* and 146*b* have the same configuration, only the pressing member 146*b* will be described.

Figure 22:
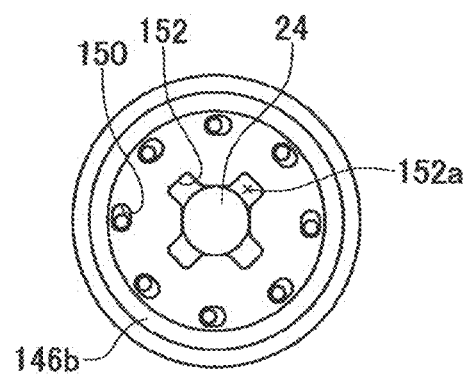
FIG. 22 shows a cross-sectional view along line XXII-XXII in FIG. 21 (a resin portion is not shown).

As shown in FIG. 22, the pressing member 146*b* includes a through-hole 152 in which the shaft 24 is press-fitted to the center thereof, and a plurality of through-holes 150 that is disposed along the outer circumference thereof. The through-hole 152 has the same shape as the through-holes (see FIG. 23) of the back yoke 141. Thus, communication holes 152*a* that communicate with the communication holes 141*a* formed between the back yoke 141 and the shaft 24 are also formed between the pressing member 146*b* and the shaft 24. Thus, in the fifth embodiment, the resin portions 144*a* and 146*a* can be formed by a single resin-molding process. The through-hole 150 is formed at a position corresponding to the through-hole 148*b* that is formed in the front end portion of the projecting piece 148*a* of the restriction plate 142. Thus, when the resin portions 144*a* and 146*a* are formed, a resin flows into the insides of the through-hole 150 of the pressing members 144*b* and 146*b* and the through-hole 148*b* of the restriction plate 142, and these insides are filled with the resin. As a result, all of the pressing members 144*b* and 146*b*, the restriction plate 142, the permanent magnet 140, and the back yoke 141 are fixed after the resin-molding operation. The opening 148*d* of the restriction plate 142 is prevented from being deformed according to the force of the permanent magnet 140 that is to be separated from the back yoke 141 according to the centrifugal force during the rotation of the rotor 22. Thus, the permanent magnet 140 is prevented from being separated from the back yoke 141.

In the rotor 22 according to the fifth embodiment, since the shaft 24 is press-fitted to the back yoke 141 and the pressing members 144*b* and 146*b*, the resin portion does not require a holding force against the centrifugal force, and a large mechanical strength is not required for the resin portion. As a result, it is possible to suppress the size of the rotor 22 from increasing. Moreover, since the rotor 22 includes the communication holes 141*a* and 152*a* that pass through the back yoke 141 and the pressing members 144*b* and 146*b*, it is possible to form the resin portions 144*a* and 146*a* by a single resin-molding process.

Further, in the rotor 22 according to the fifth embodiment, the restriction plates 142 and the pressing members 144*b* and 146*b* are disposed on both upper and lower ends of the permanent magnet 140. Thus, a positional shift of the permanent magnet 140 in relation to the back yoke 141 is unlikely to occur, and the back yoke 141 and the permanent magnet 140 can be maintained in an appropriate positional relationship when forming the resin portions. As a result, it is possible to manufacture the rotor 22 with high accuracy. Furthermore, it is possible to control the flow of a resin with the pressing members 144*b* and 146*b* so that the resin does not enter into the opening of the restriction plate 142 and the clearance between the permanent magnets 140 and to prevent the occurrence of burring of the resin.

Figure 25:
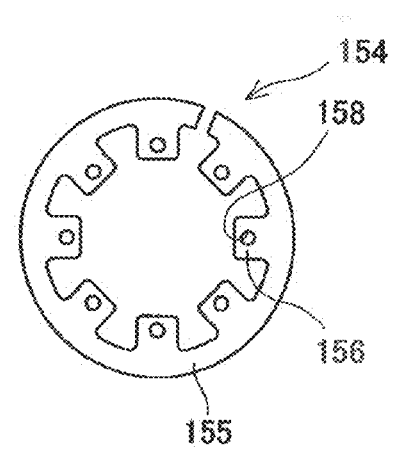
FIG. 25 shows a plan view (corresponding to FIG. 24) of a restriction plate according to a modification of the fifth embodiment.

A restriction plate 154 as shown in FIG. 25 may be used as the restriction plate that is disposed in the end portion of the permanent magnet 140. As shown in FIG. 25, the restriction plate 154 includes a ring-shaped plate portion 155 that makes contact with the upper or lower end surface of the permanent magnet 140. A projecting piece 156 in which a through-hole 158 is formed is formed on an inner circumferential edge of the plate portion 155. According to such a configuration, since a deformation of the restriction plate 154 is suppressed by the plate portion 155, it is possible to ideally hold the permanent magnet 140.

Figure 26:
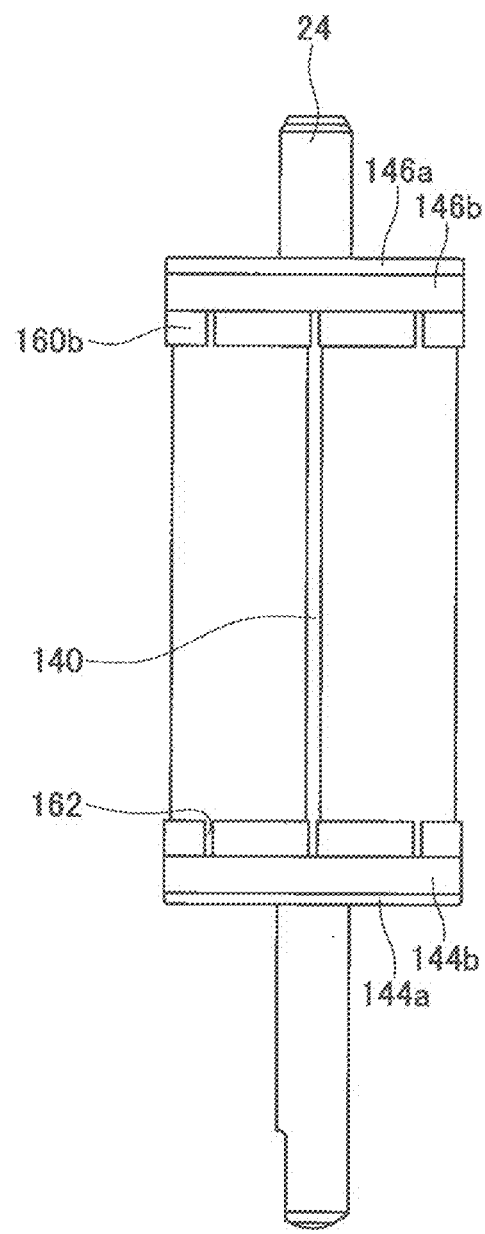
FIG. 26 shows a front view of a rotor according to a modification of the fifth embodiment.
Figure 27:
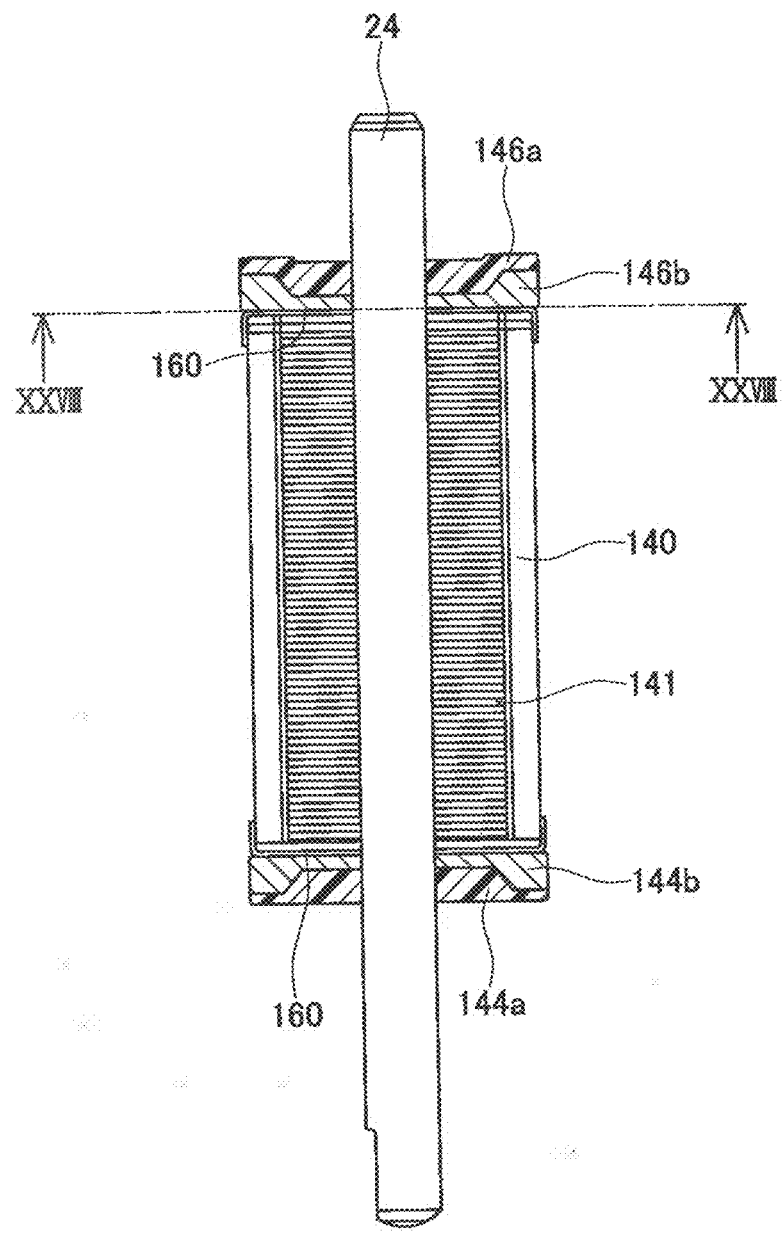
FIG. 27 shows a longitudinal cross-sectional view of the rotor shown in FIG. 26.
Figure 28:
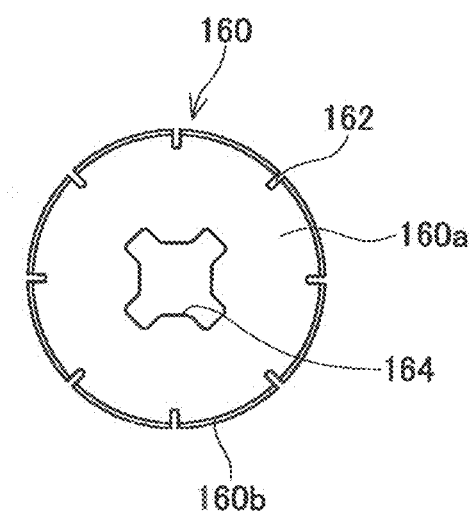
FIG. 28 shows a cross-sectional view along line XXVIII-XXVIII in FIG. 27.

Alternatively, a restriction plate 160 shown in FIGS. 26 to 28 may be used. As shown in FIGS. 26 to 28, the restriction plate 160 includes a first planar portion 160*a* that makes contact with the end surfaces of the back yoke 141 and a second planar portion 160*b* that makes contact with the outer circumferential surface of the permanent magnet 140. A through-hole 164 is formed at the center of the first planar portion 160*a*. The through-hole 164 has the same shape as the through-hole 152 that is formed at the center of the pressing members 144*b* and 146*b*. On the other hand, slits 162 are formed in the second planar portion 160*b* at an interval in the circumferential direction (see FIG. 26). Since the slits 162 are formed in the second planar portion 160*b*, the second planar portion 160*b* can be deformed according to the thickness of the permanent magnet 140. In this embodiment, each of the restriction plates 142, 154 and 160 is an example of the "magnet holder".

(Modification)

For example, in the above-described embodiments, although a plurality of core plates is stacked to form the back yoke, the present teaching is not limited to such an embodiment, and a cylindrical back yoke may be used.

(Sixth Embodiment)

Figure 29:
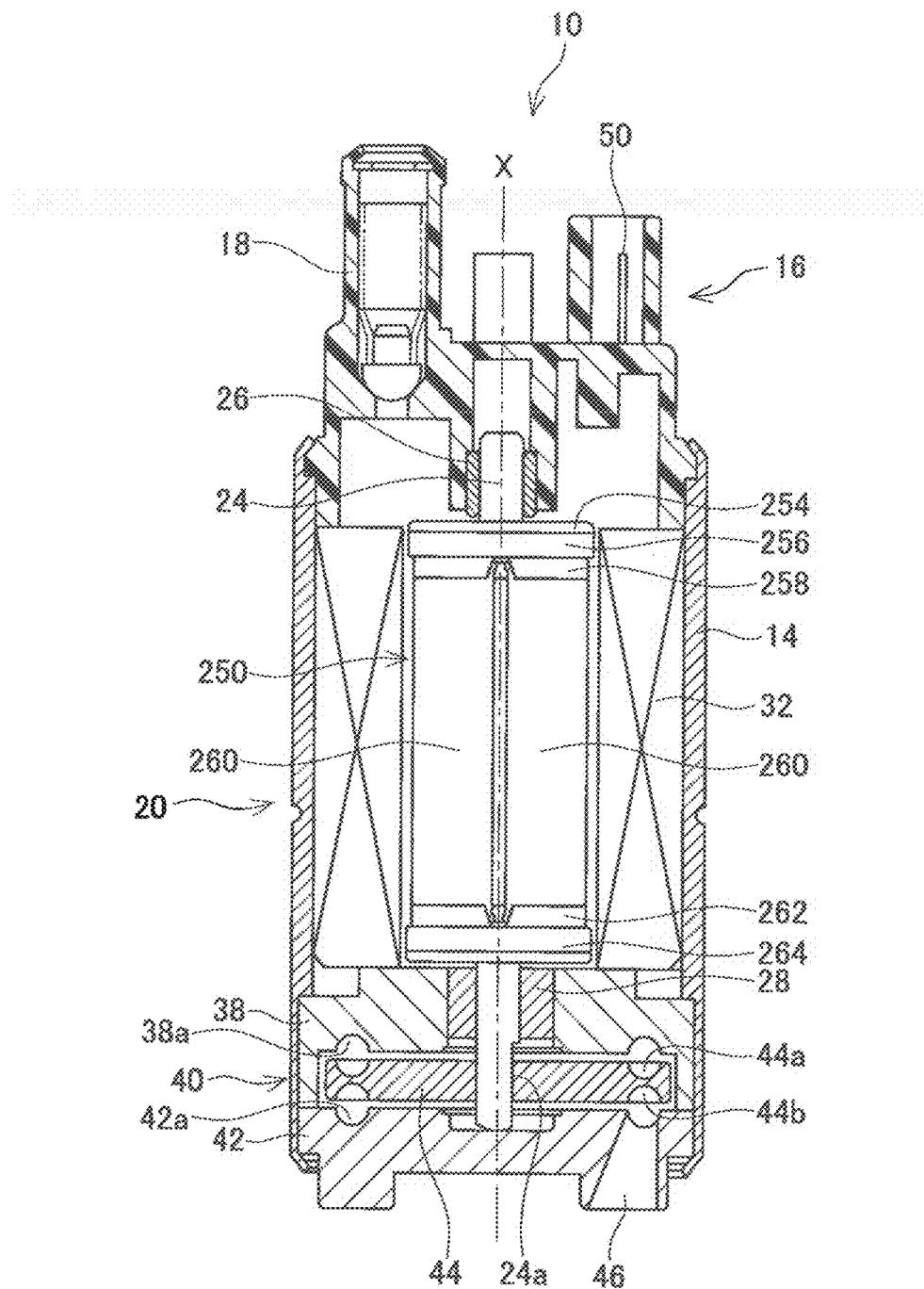
FIG. 29 shows a longitudinal cross-sectional view of a fuel pump according to a sixth embodiment.

In a fuel pump 210 according to this embodiment, the rotor 22 of the fuel pump 10 according to the first embodiment is modified. In this embodiment, the configuration of only the rotor which is different from that of the fuel pump 10 according to the first embodiment will be described. In FIG. 29, the same configurations as the fuel pump 10 according to the first embodiment are denoted by the same reference numerals as those used in FIG. 1. In FIG. 29, a small gap is depicted between the front end surfaces of a plurality of slots and the outer circumferential surface of a rotor 250.

Figure 34:
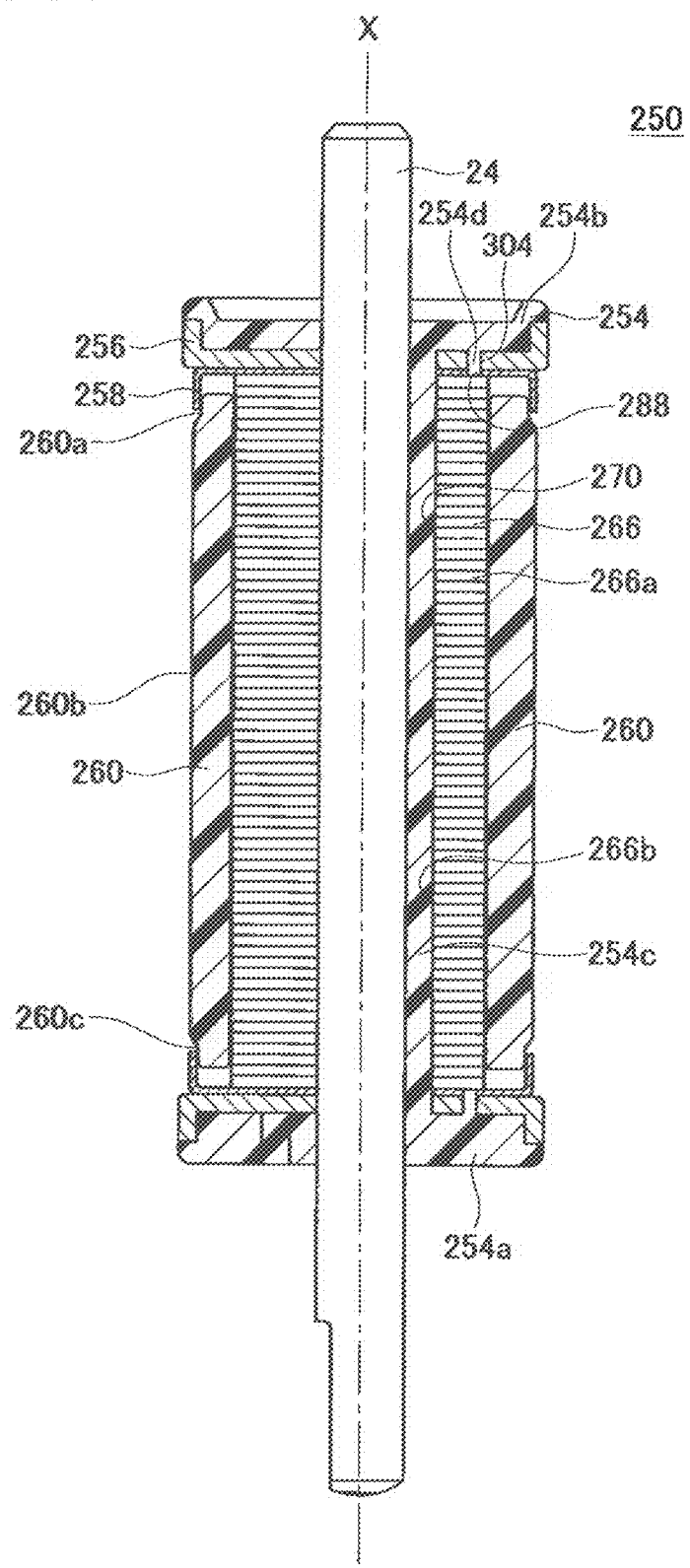
FIG. 34 shows a cross-sectional view along XXXIV-XXXIV in FIG. 33.

As shown in FIG. 29, the rotor 250 includes a shaft 24, a plurality of (four in this embodiment) permanent magnets 260, two magnet holders 258 and 262, two pressing members 256 and 264, a resin layer 254, and a back yoke 266 (see FIG. 34).

As shown in FIG. 34, the back yoke 266 includes a plurality of core plates 266*a* stacked in a direction of the axial line X. Each core plate 266*a* is formed of a magnetic steel plate. A through-hole is formed at the center of each core plate 266*a*. Due to the through-hole formed in each core plate 266*a*, a through-hole 266*b* that extends in the direction of the axial line X is formed in the back yoke 266. The shaft 24 is press-fitted to the through-hole 266*b* of the back yoke 266. The through-hole 266*b* has the same shape as a through-hole 294 described later when see from the direction of the axial line X. Thus, when the shaft 24 is press-fitted to the through-hole 266*b* of the back yoke 266, four communication holes 270 are formed between the outer circumferential surface of the shaft 252 and the inner circumferential surface of the through-hole 266*b* of each core plate. Each communication hole 270 extends in parallel to the direction of the axial line X and passes through the back yoke 266.

The plurality of permanent magnets 260 has the same configuration as the permanent magnets 64a to 64d. An outer circumferential surface 260a that is closer to the axial line X than an outer circumferential surface 260b at an intermediate portion of each permanent magnet 260 in a perpendicular cross-section is formed on an upper end portion of each permanent magnet 260. Similarly, an outer circumferential surface 260c that is closer to the axial line X than the outer circumferential surface 260b at an intermediate portion of the permanent magnets 260 in a perpendicular cross-section is formed in a lower end portion of each permanent magnet 260. The outer circumferential surfaces 260a and 260c are closer to the axial line X than the outer circumferential surface 260b by an amount corresponding to the thickness of the magnet holders 258 and 262 described later. That is, the outer diameter of a cylinder that is formed of a plurality of outer circumferential surfaces 260a and a plurality of outer circumferential surfaces 260c is smaller than the outer diameter of a cylinder that is formed of a plurality of outer circumferential surfaces 260b.

Figure 31:
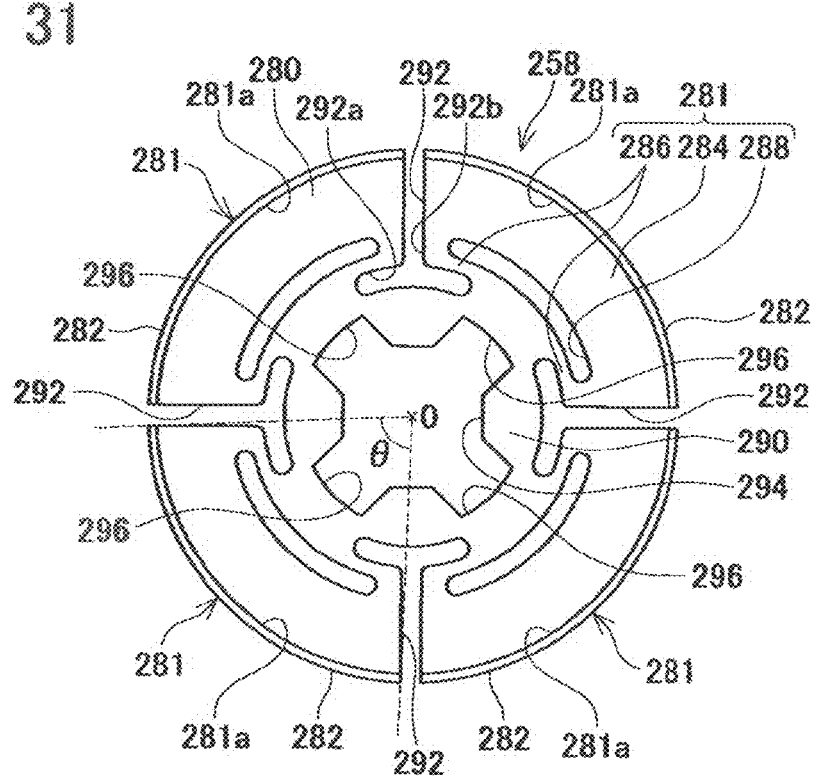
FIG. 31 shows a plan view of a magnet holder.
Figure 32:
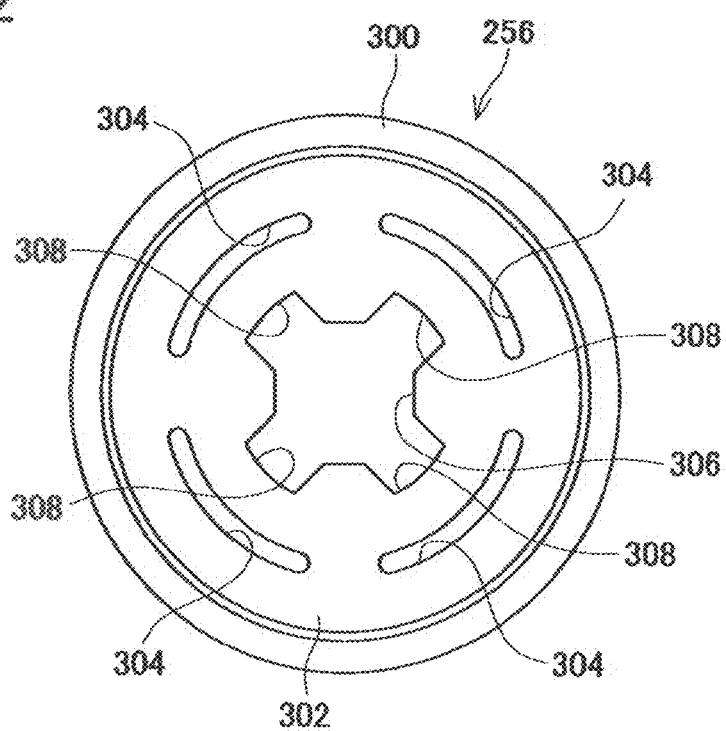
FIG. 32 shows a plan view of a pressing member.
Figure 33:
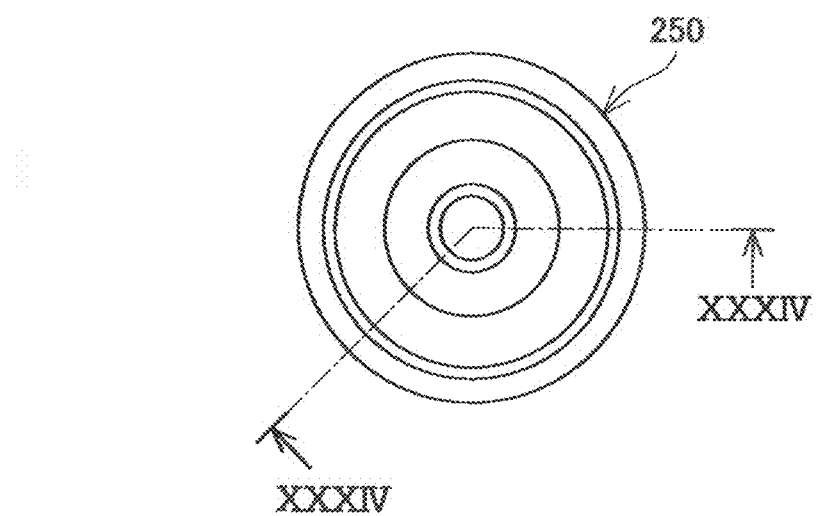
FIG. 33 shows a plan view of the rotor.

The magnet holder 258 is disposed on the upper surface of the back yoke 266 and the upper surfaces of the permanent magnets 260. The magnet holder 258 is formed of a non-magnetic material. As shown in FIG. 31, the magnet holder 258 includes a base portion 280 and a plurality of (four in this embodiment) peripheral wall portions 282. The base portion 280 has a circular planar shape. The base portion 280 faces the upper surface of the back yoke 266 and the upper surfaces of the permanent magnets 260. The outer diameter of the base portion 280 in a state before being attached to the plurality of permanent magnets 260 is slightly smaller than the outer diameter of a cylinder that is formed by the outer circumferential surfaces 260a of the plurality of permanent magnets 260. As shown in FIG. 31, the base portion 280 includes an inner circumference part 290 and a plurality of (four in this embodiment) peripheral parts 281.

The inner circumference part 290 has such a ring shape that has a through-hole 294 at a central portion thereof. The diameter of the through-hole 294 is slightly smaller than the diameter of the shaft 24. A plurality of (four in this embodiment) rectangular communication holes 296 that extend in a radial direction (hereinafter referred to as a "first radial direction") of the base portion 280 is formed in the through-hole 294. The plurality of through-holes 296 is disposed at an equal interval in the circumferential direction (hereinafter referred to as a "circumferential direction") of the base portion 280. The shaft 24 is press-fitted to the through-hole 294. As a result, each communication hole 296 communicates with each communication hole 270 that is formed by the shaft 24 and the back yoke 266. In other words, each communication hole 270 extends in parallel to the axial line X and passes through the back yoke 266 and the magnet holder 258.

The plurality of peripheral parts 281 is disposed at an interval around the outer edge of the inner circumference part 290. A notch 292 is formed between the adjacent peripheral parts 281. The notch 292 has a configuration in which a second part 292a that extends in the circumferential direction is connected to an inner end in the first radial direction of a first part 292b that extends in the first radial direction. The first part 292b is located at the position corresponding to the boundary between the adjacent permanent magnets 260.

Each peripheral part 281 has a partially circular shape. The inner circumference part 290 is connected to the inner circumferential edge of each peripheral part 281. A connecting part 281a connected to the peripheral wall portion 282 is formed on the outer circumferential edge of each peripheral part 281 (see FIG. 30). On an inner edge side of each peripheral part 281, a beam part 286 is formed on both ends in the circumferential direction of each peripheral part 281. That is, each peripheral part 281 includes two beam parts 286. Each beam part 286 is a portion of the base portion 280 that has a smallest width. Each beam part 286 is a portion of the base portion 280 that has a lowest rigidity. Each beam part 286 extends in the circumferential direction, and the inner circumference part 290 is connected to one end of each beam part 286. An outer circumference part 284 is connected to the other end of each beam part 286. That is, the inner circumference part 290 and the outer circumference part 284 are connected by two beam parts 286. Each of the two beam parts 286 is connected to one end in the circumferential direction of the outer circumference part 284. A through-hole 288 is formed between the outer circumference part 284 and the inner circumference part 290. The through-hole 288 is positioned on the outer side in the first radial direction more than the second portion 292a and extends in the circumferential direction. Each beam part 286 is formed between the through-hole 288 and the notch 292. More specifically, when the beam part 286 is traced toward the outer side from the inner side in the first radial direction, the beam part 286 extends in the circumferential direction between the through-hole 288 and the second part 292a and then extends in the first radial direction between the through-hole 288 and the first part 292b.

Figure 30:
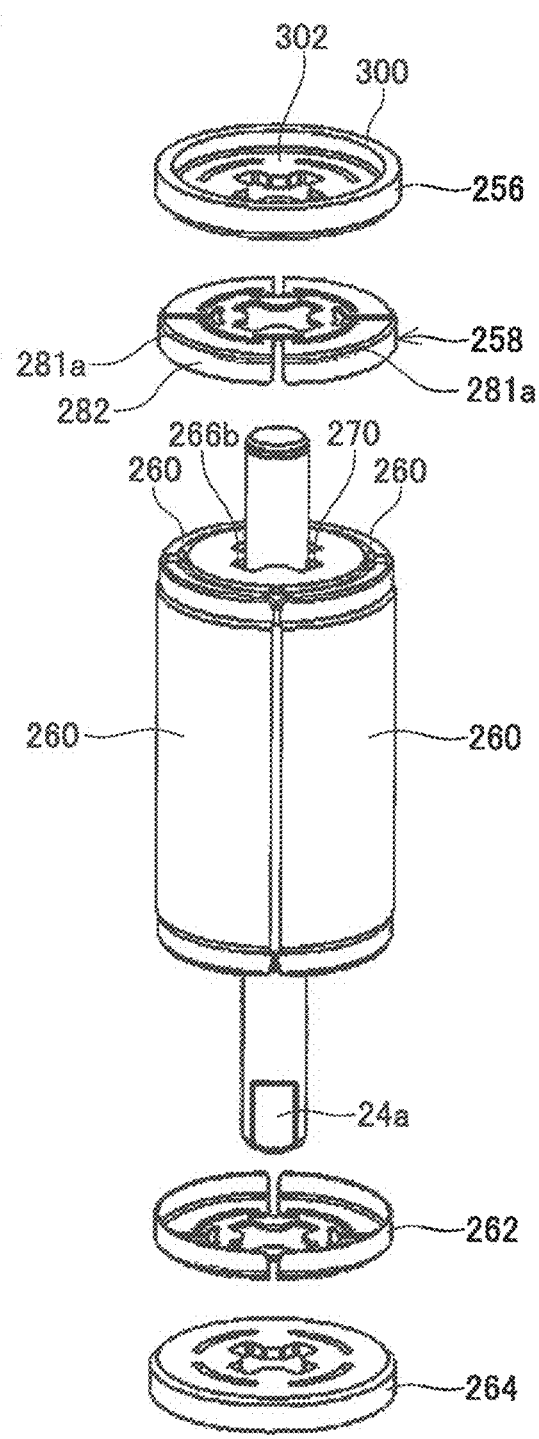
FIG. 30 shows an exploded perspective view of a rotor.

Since the first part 292b of the notch 292 is positioned at the boundary between the two permanent magnets 260, each outer circumference part 284 is disposed at such a position that the outer circumference part 284 faces an end surface of each permanent magnet 260. The peripheral wall portion 282 is connected to the outer end in the first radial direction of each outer circumference part 284. As shown in FIG. 30, the peripheral wall portion 282 protrudes vertically toward the permanent magnets 260 from the base portion 280. The length in the circumferential direction of the peripheral wall portion 282 is the same as the length in the circumferential direction of the outer end in the first radial direction of the outer circumference part 284. In this configuration, the plurality of peripheral wall portions 282 forms a cylindrical form. The peripheral wall portion 282 is connected to the outer circumference part 284 with the entire length in the circumferential direction. As shown in FIG. 31, in a plane perpendicular to the axial line X, the angle θ between a line that connects one end in the circumferential direction of the connecting part 281a and the center O (that is, the center of the shaft 24) and a line that connects the other end in the circumferential direction of the connecting part 281a and the center O of the base portion 280 is 86°.

As shown in FIG. 30, when the magnet holder 258 is attached to the permanent magnets 260, the shaft 24 is press-fitted to the through-hole 294. Moreover, the permanent magnets 260 engage with the cylindrical form that is formed by the plurality of peripheral wall portions 282. Due to this, the outer circumferential surface 260a of each permanent magnet 260 makes contact with the inner circumferential surface of the peripheral wall portion 282 of the magnet holder 258. In a state before the magnet holder 258 is attached to the permanent magnets 260 (that is, a natural state), the inner diameter of the cylinder that is formed by the plurality of peripheral wall portions 282 is slightly smaller than the outer diameter of the cylinder that is formed by the outer circumferential surfaces 260a of the plurality of permanent magnets 260. Thus, when the permanent magnet 260 engages with the cylinder that is formed by the plurality of peripheral wall portions 282, the beam part 286 of the base portion 280 that has the lowest rigidity is deformed, and the outer circumference part 284 is displaced so as to be separated from the inner circumference part 290. As a result, the permanent magnets are fitted in the magnet holder 258. In this case, the peripheral wall portion 282 that protrudes vertically toward the permanent magnets 260 from the base portion 280 is maintained at a vertical angle with respect to the base portion 280. That is, when the magnet holder 258 is attached to the permanent magnet 260, the peripheral wall portion 282 is not inclined toward the outer side of the rotor 250. In other words, the beam part 286 is formed so that the peripheral wall portion 282 is not inclined toward the outer side of the rotor 250 in a state where the magnet holder 258 is attached to the permanent magnet 260. The base portion 280 is in contact with the upper surface of the back yoke 266 and a gap is formed between the base portion 280 and the upper surface of the permanent magnet 260.

The magnet holder 262 is disposed between the lower surface of the back yoke 266 and the lower surface of the permanent magnet 260. The magnet holder 262 has the same configuration as the magnet holder 258. The magnet holder 262 is attached to the permanent magnet 260 in such a manner that the shaft 24 is press-fitted to the through-hole of the magnet holder 262, and the permanent magnets 260 engage with the cylinder that is formed by the plurality of peripheral wall portions. As a result, each communication hole 270 passes through the magnet holder 262 as well as the back yoke 266 and the magnet holder 258. The outer diameter of the base portion of the magnet holder 262 is slightly smaller than the outer diameter of the cylinder that is formed by the outer circumferential surfaces 260c of the plurality of permanent magnets 260. Thus, when the magnet holder 262 is attached to the permanent magnet 260, the magnet holder 262 is deformed in a manner similar to a case where the magnet holder 258 is attached to the permanent magnets 260.

The pressing member 256 is disposed on a side of the magnet holder 258 opposite to the permanent magnets 260. As shown in FIG. 30, the pressing member 256 includes a pressing portion 302 and an outer circumferential portion 300. The pressing portion 302 has a disk shape. The pressing portion 302 has a radius that is approximately the same as that of the base portion 280 in a state of being attached to the permanent magnets 260. The pressing portion 302 is attached to the shaft 24 in a state of being in contact with the base portion 280. A through-hole 306 is formed in a central portion of the pressing portion 302. A diameter of the through-hole 306 is slightly smaller than the diameter of the shaft 24. A plurality of rectangular communication holes 308 having the same shape as the through-hole 296 is formed in the through-hole 306 at a position that overlaps the communication hole 296 of the magnet holder 258. The shaft 24 is press-fitted to the through-hole 306. When the shaft 24 is press-fitted to the through-hole 306, the outer circumferential surface of the shaft 24 and the through-holes 308 form a communication hole that communicates with the communication hole 270 that is formed by the shaft 24, the back yoke 266, and the magnet holders 258 and 262. In other words, each communication hole 270 passes through the back yoke 266, the magnet holders 258 and 262, and the pressing member 256.

The outer circumferential portion 300 is disposed on the outer edge of the pressing portion 302. The outer circumferential portion 300 vertically protrudes toward a side opposite to the magnet holder 258 in relation to the pressing portion 302. The outer circumferential portion 300 surrounds the pressing portion 302 along the outer edge of the pressing portion 302. The outer diameter of the outer circumferential portion 300 is larger than the outer diameter of the magnet holder 258.

As shown in FIG. 30, the pressing member 264 is disposed on a side of the magnet holder 262 opposite to the permanent magnet 260. The pressing member 264 has the same configuration as the pressing member 256. The pressing member 264 is attached to the shaft 24 in such a manner that the shaft 24 is press-fitted to the through-hole of the pressing member 264, and the base portion of the magnet holder 262 makes contact with the pressing portion of the pressing member 264. As a result, each communication hole 270 passes through the pressing member 264 as well as the back yoke 266, the magnet holder 258 and 262, and the pressing member 256.

As shown in FIG. 34, the resin layer 254 is disposed on a side of the pressing members 256 and 264 opposite to the permanent magnet 260. The resin layer 254 comprises a first resin portion 254a, a second resin portion 254b and a third resin portion 254c. The first resin portion 254a is similar to the first resin portions 68a and 103a. The second resin portion 254b is similar to the first resin portions 68b and 103b. The third resin portion 254c is the third resin portion 68c and 103c. The resin layer 254 is integrally formed so as to pass through the through-hole 270 from a side of the pressing portion 302 opposite to the permanent magnets 260 to a side of the pressing portion of the pressing member 264 opposite to the permanent magnets 260. In a modification, the third resin portion 254c may be formed in a through-hole of the back yoke 266. Moreover, the resin layer 254 further comprises fifth resin portion 254d which is disposed in the through-hole 304 of the pressing member 256 and the through-hole 288 of the magnet holder 258.

Next, a method of manufacturing the rotor 250 will be described. First, the shaft 24 is press-fitted to the through-hole 266b of the back yoke 266. Subsequently, the shaft 24 is press-fitted to the through-hole 294 of the magnet holders 258 and 262, and the permanent magnets 260 engage with (fit in) the magnet holder 258. In this case, an external force is applied to the magnet holder 258 to deform the beam part 286, whereby the outer circumference part 284 is moved so as to be separated from the inner circumference part 290. As a result, the inner diameter of the cylinder that is formed by the plurality of peripheral wall portions 282 increases. When the permanent magnets 260 are inserted into the cylinder that is formed by the plurality of peripheral wall portions 282, the external force applied to the magnet holder 258 is released. Due to this, the elastic deformation of the beam part 286 is released. As a result, the peripheral wall portion 282 presses the permanent magnets 260 in the radial direction of the permanent magnets 260. The same is true for the magnet holder 262. In a state where the magnet holder 258 is attached to the permanent magnet 260, the circumferential direction of the base portion 280 is the same as the circumferential direction of the permanent magnets 260.

Further, the shaft 24 is press-fitted to the through-holes 306 of the pressing members 256 and 264, and the pressing members 256 and 264 are brought into contact with the magnet holders 258 and 262, respectively. In this state, the respective portions 252, 256, 258, 260, 262, 264, and 266 are disposed in a mold. Moreover, a resin is injected into the mold to form the resin layer 254. As a result, due to the resin layer 254, the pressing portion 302 of the pressing member 256 presses the base portion 280 of the magnet holder 258 toward the back yoke 266. Similarly, due to the resin layer 254, the pressing portion of the pressing member 264 presses the base portion of the magnet holder 262 toward the back yoke 266. As a result, it is possible to prevent the base portion 280 of the magnet holders 258 and 262 from being deformed in the direction of the axial line X.

(Effect of this Embodiment)

In this embodiment, the permanent magnets 260 are supported by the magnet holders 258 and 262 in a state where the permanent magnets 260 are restricted from moving in relation to the back yoke 266. As a result, it is possible to suppress the permanent magnets 260 from being displaced toward the outer side in the radial direction (hereinafter referred to as a "second radial direction") of the rotor 250 due to the rotation of the rotor 250. Thus, even when the clearance between the rotor 250 and the stator 32 is not increased by taking a displacement of the permanent magnet 260 toward the outer side in the second radial direction into consideration, the motor efficiency of the motor portion 20 does not decrease.

Before the magnet holder 258 is attached to the permanent magnet 260, the inner diameter of the cylinder that is formed by the peripheral wall portions 282 is smaller than the outer diameter of the cylinder that is formed by the plurality of permanent magnets 260. As a result, in a state where the magnet holder 258 is attached to the permanent magnets 260, the magnet holder 258 applies a force that is directed toward the inner side in the second radial direction to the permanent magnets 260. Thus, it is possible to appropriately suppress the permanent magnets 260 from being displaced toward the outer side in the second radial direction. The same is true for the magnet holder 262.

Moreover, when the magnet holder 258 is attached to the permanent magnets 260, the beam parts 286 of the base portion 280 are deformed whereby the inner diameter of the cylinder that is formed by the plurality of peripheral wall portions 282 increases. Thus, when the magnet holder 258 is attached to the permanent magnets 260, it is possible to suppress the peripheral wall portion 282 from being inclined toward the outer side of the rotor 250. Therefore, it is not necessary to increase the clearance between the rotor 250 and the stator 32 by taking the inclination of the peripheral wall portion 282 into consideration. Accordingly, the motor efficiency of the motor portion 20 does not decrease. The same is true for the magnet holder 262.

The beam parts 286 are connected to respective ends of the outer circumference part 284 in the circumferential direction. According to this configuration, it is possible to stably connect the outer circumference part 284 to the inner circumference part 290 as compared to a configuration where one beam part is formed in the outer circumference part 284. Thus, the magnet holder 258 can stably support the permanent magnets 260. Moreover, when the beam part 286 is deformed so that the outer circumference part 284 is displaced, the two beam parts 286 connected to one outer circumference part 284 are balanced, and the outer circumference part 284 can be appropriately displaced toward the outer side in the second radial direction (that is, the first radial direction). The same is true for the magnet holder 262.

In a perpendicular cross-section, the outer circumferential surfaces 260a of the permanent magnets 260 that are in contact with the peripheral wall portion 282 are closer to the axial line X than the outer circumferential surfaces 260b of the permanent magnets 260 by an amount corresponding to the thickness of the magnet holder 258. According to this configuration, the peripheral wall portion 282 is disposed on the same plane as the outer circumferential surfaces 260a of the permanent magnets 260. Thus, it is not necessary to increase the clearance between the rotor 250 and the stator 32 by taking the thickness of the peripheral wall portion 282 into consideration. The same is true for the relationship between the magnet holder 262 and the outer circumferential surfaces 260c. Moreover, the outer circumferential surface 260a does not need to be in the close vicinity of the axial line X by taking the inclination of the peripheral wall portion 282 into consideration. According to this configuration, it is not necessary to increase the gap between a portion of the permanent magnet 260 to which the magnet holders 258 and 262 are attached and the stator 32. As a result, the portions of the permanent magnets 260 to which the magnet holders 258 and 262 are attached can generate a magnetic force for rotating the rotor 250 similarly to the other portions of the permanent magnets 260. Due to this, it is possible to suppress the motor efficiency of the motor portion 20 from decreasing.

When a force that is directed toward the outer side in the second radial direction is applied to the permanent magnet 260 during the rotation of the rotor 250, a force that is directed toward the outer side in the second radial direction is applied from the permanent magnets 260 to the peripheral wall portions 282 of the magnet holder 258. The resin layer 254, i.e., the fifth resin portion 254d is inserted in the through-hole 304 of the pressing member 256 and the through-hole 288 of the magnet holder 258. Thus, the beam part 286 of the magnet holder 258 can be restricted by the resin layer 254 from being deformed toward the outer side in the second radial direction. The same is true for the relationship between the pressing member 264 and the magnet holder 262. In the modification, the pressing member 256 may include a projecting portion that is inserted into a through-hole or a concave portion that is formed on the outer circumference part 284 of the magnet holder 258. According to this configuration, the projecting portion can suppress the outer circumference part 284 of the magnet holder 258 from moving in a direction to be separated from the inner circumference part 290 during the rotation of the rotor 250 and from being deformed toward the outer side in the second radial direction. In general, the rotor 250 may include a restricting portion configured to restrict the outer circumference part 284 of the magnet holder 258 from being displaced in a direction (a direction to be separated from the axial line X) to be separated from the inner circumference part 290 during the rotation of the rotor 250.

The outer diameter of the outer circumferential portion 300 of the pressing member 256 is larger than the outer diameter of the magnet holder 258. According to this configuration, by adjusting the outer shape of the outer circumferential portion 300, it is possible to easily adjust a weight balance of the rotor 250.

Moreover, according to the outer circumferential portion 300, it is possible to suppress a resin from reaching the permanent magnets 260 when forming the resin layer 254. As a result, it is possible to suppress the pressure of the resin during forming of the resin from being applied to the permanent magnets 260. Thus, it is possible to suppress the permanent magnets 260 from being damaged during forming of the resin. Further, it is possible to prevent the resin from being formed on the outer circumference of the permanent magnets 260. Thus, it is possible to decrease the clearance between the permanent magnets 260 and the stator 32.

In the connecting part 281a between the peripheral wall portion 282 and the peripheral part 281 (that is, the outer circumference part 284), the angle θ between the line that connects one end in the circumferential direction of the connecting part 281a and the center O of the base portion 280 and the line that connects the other end in the circumferential direction of the connecting part 281a and the center O of the base portion 280 is 86°. According to this configuration, it is possible to appropriately suppress the peripheral wall portion 282 from being inclined toward the outer side of the rotor 250 according to the force that is directed toward the outer side in the second radial direction (that is, the first radial direction) that is applied from the permanent magnets 260 to the peripheral wall portions 282 during rotation of the rotor 250.

Figure 35:
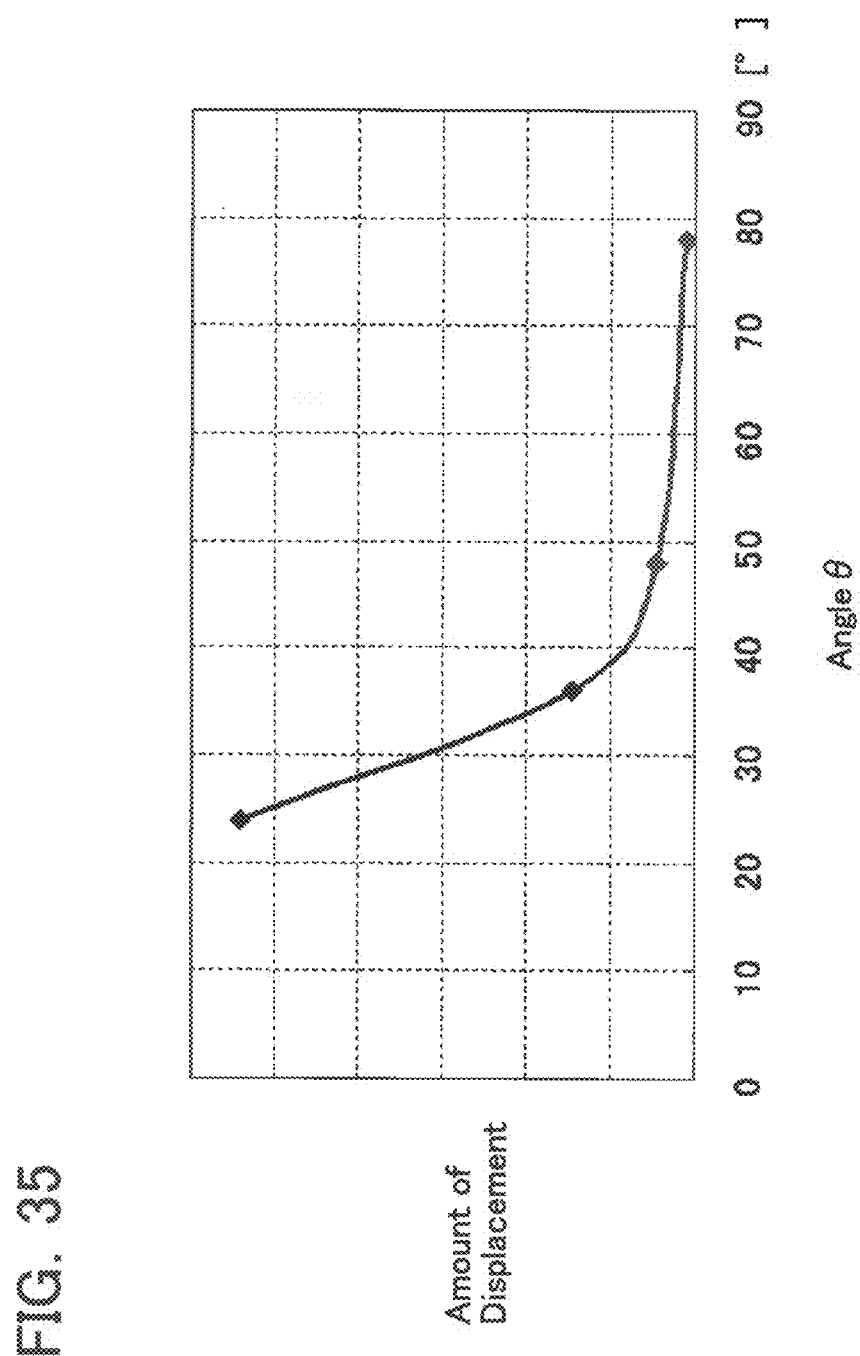
FIG. 35 shows a graph showing a relationship between an angle θ of a connecting part and an amount of displacement of a peripheral wall portion.

FIG. 35 shows the calculation results obtained through a simulation, of the amount of displacement of the outer circumferential end at the outermost side in the second radial direction (that is, the first radial direction) of the peripheral wall portion 282 during the rotation of the rotor 250 when the angle θ is changed. The number of rotations of the rotor 250 is 12000 rpm which is used as the number of rotations of a motor of a general fuel pump. The vertical axis of FIG. 35 represents the amount of displacement, and the horizontal axis represents the angle θ. As a result, when the angle θ is 40° or more, it is possible to appropriately suppress the peripheral wall portion 282 from being inclined toward the outer side of the rotor 250. Moreover, when the angle θ is smaller than 40°, a variation of the amount of displacement of the outer circumferential end of the peripheral wall portion 282 in relation to a variation of the angle θ is larger than that when the angle θ is 40° or more. Thus, if the angle θ is designed to be smaller than 40°, when the actual dimension is decreased by 1°, the amount of displacement of the outer circumferential end of the peripheral wall portion 282 becomes significantly larger than the designed amount of displacement. On the other hand, if the angle θ is designed to be 40° or more, when the actual dimension is decreased by 1°, the amount of displacement of the outer circumferential end of the peripheral wall portion 282 is not greatly changed from the designed amount of displacement. Thus, when the angle θ is 40° or more, it is not necessary to increase the clearance between the rotor 250 and the stator 32 by taking the dimensional accuracy into consideration.

(Modification)

For example, in the above-described embodiments, although a plurality of core plates is stacked to form the back yoke, the present teaching is not limited to such an embodiment, and a cylindrical back yoke may be used.

Moreover, the magnet holder may be a magnet holder having a shape different from that of the magnet holders 258 and 262. For example, magnet holders 358, 458, 558, and 658 may be used.

Figure 36:
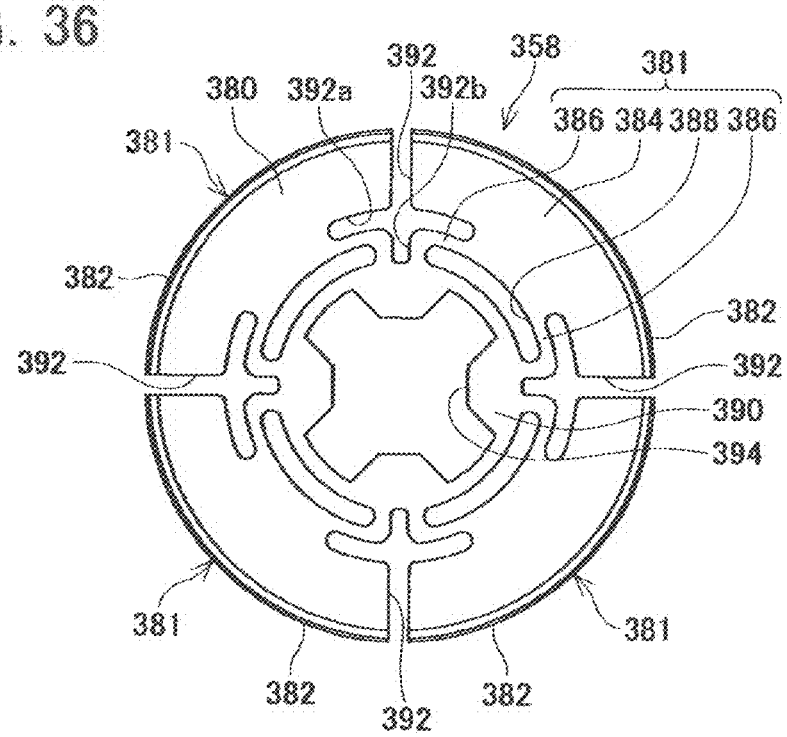
FIG. 36 shows a plan view of a magnet holder according to a modification.

As shown in FIG. 36, the magnet holder 358 may have a configuration in which the shapes of a notch 392 and a beam part 386 of a base portion 380 are different from the shapes of the notch 292 and the beam part 286 of the magnet holder 258. Besides this, the magnet holder 358 may have the same configurations 381 (384 and 388), 382, 390, and 394 as the respective configurations 281 (284 and 288), 282, 290, and 294 of the magnet holder 258. The notch 392 may be formed at an intermediate position (specifically, closer to the outer side in the first radial direction more than the through-hole 388) of a first part 392b that extends in the first radial direction so as to be connected to a second portion 392a that extends in the circumferential direction. The beam part 386 may be formed between the trough-hole 388 and the notch 392. More specifically, when the beam part 386 is traced toward the outer side from the inner side in the first radial direction, the beam part 386 may extend in the first radial direction between the through-hole 388 and the first part 392b and then extend in the circumferential direction between the through-hole 388 and the second part 392a.

Figure 37:
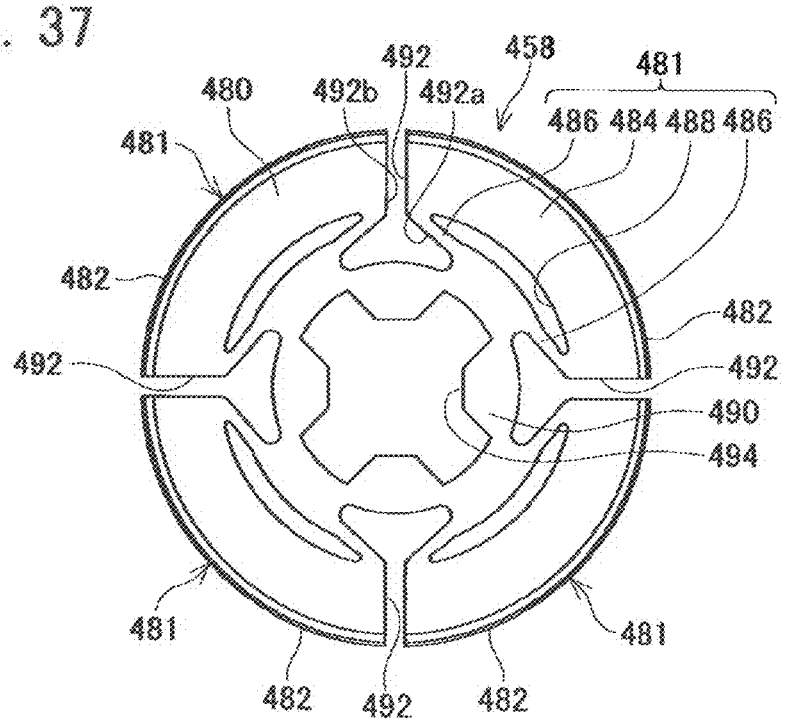
FIG. 37 shows a plan view of a magnet holder according to a modification.

As shown in FIG. 37, the magnet holder 458 may have a configuration in which the shapes of a notch 492, a through-hole 488, and a beam part 486 of a base portion 480 are different from the shapes of the notch 292, the through-hole 288, and the beam part 286 of the magnet holder 258. Besides this, the magnet holder 458 may have the same configurations 481 (484), 482, 490, and 494 as the respective configurations 281 (284), 282, 290, and 294 of the magnet holder 258. The notch 492 may have a configuration in which a second part 492a having an approximately triangular shape is connected to the inner end in the first radial direction of a first part 492b that extends in the first radial direction. The through-hole 488 may be positioned closer to the outer side in the first radial direction more than the second part 492a and may extend in the circumferential direction. Peripheral edges at both ends of the through-hole 488 may be formed in a linear form following the shape of the second part 492a. The beam part 486 may be formed between the through-hole 488 and the notch 492. The beam part 486 may extend in a linear form that is inclined in relation to the first radial direction between the through-hole 488 and the second part 492a.

Figure 38:
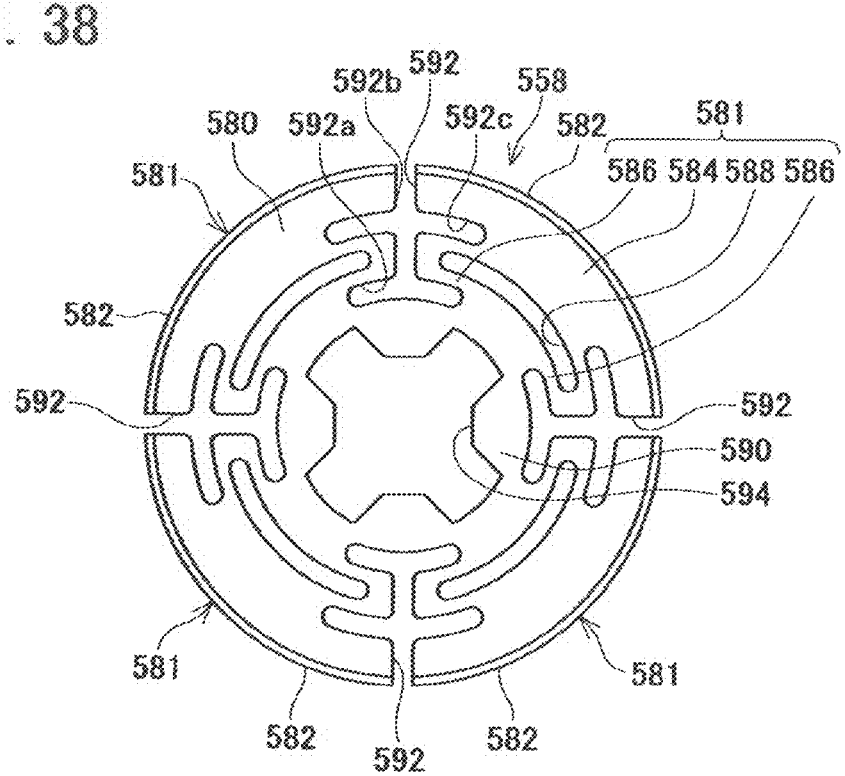
FIG. 38 shows a plan view of a magnet holder according to a modification.

As shown in FIG. 38, the magnet holder 558 may have a configuration in which the shapes of a notch 592 and a beam part 586 of a base portion 580 are different from the shapes of the notch 292 and the beam part 286 of the magnet holder 258. Besides this, the magnet holder 558 have the same configurations 581 (584 and 588), 582, 590, and 594 as the respective configurations 281 (284 and 288), 282, 290, and 294 of the magnet holder 258. The notch 592 may have a configuration in which a second part 592a that extends in the circumferential direction is connected to the inner end (specifically, the inner side in the first radial direction more than the through-hole 588) in the first radial direction of a first part 592b that extends in the first direction, and a third part 592c that extends in the circumferential direction is connected to an intermediate position (specifically, the outer side in the first radial direction more than the through-hole 588) of the first part 592b. The beam part 586 may be formed between the through-hole 588 and the notch 592. More specifically, when the beam part 586 is traced toward the outer side from the inner side in the first radial direction, the beam part 586 may extend in the circumferential direction between the through-hole 588 and the second part 592a, extend in the first radial direction between the through-hole 588 and the first part 592b, and then extend in the circumferential direction between the through-hole 588 and the third part 592c.

Figure 39:
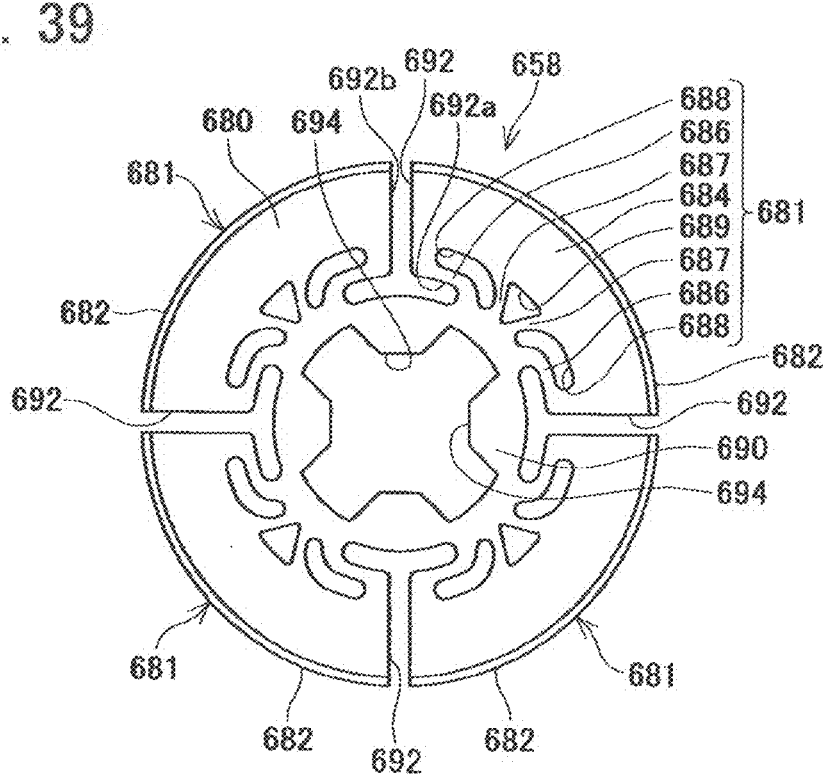
FIG. 39 shows a plan view of a magnet holder according to a modification.

As shown in FIG. 39, the magnet holder 658 may have a configuration in which the configurations of through-holes 688 and 689 and beam parts 686 and 687 of a base portion 680 are different from the configurations of the through-hole 288 and the beam part 286 of the magnet holder 258. Besides this, the magnet holder 658 may have the same configurations 681 (684), 682, 690, 692, and 694 as the respective configurations 281 (284), 282, 290, 292, and 294 of the magnet holder 258.

The through-hole 688 may be formed closer to the outer side in the first radial direction more than the than the second part 692a of the notch 692. Two through-holes 688 may be formed in one peripheral part 681. A through-hole 689 may be formed between the two through-holes 688 that are formed in one peripheral part 681 separately from the two through-holes 688. The through-hole 689 may have an approximately triangular shape. The beam part 687 may be formed between each through-hole 688 and the through-hole 689. That is, in the magnet holder 658, the inner circumference part 690 and one outer circumference part 684 may be connected to two beam parts 684 and two beam parts 687. The inner circumference part and the outer circumference part may be connected by five or more beam parts.

Figure 40:
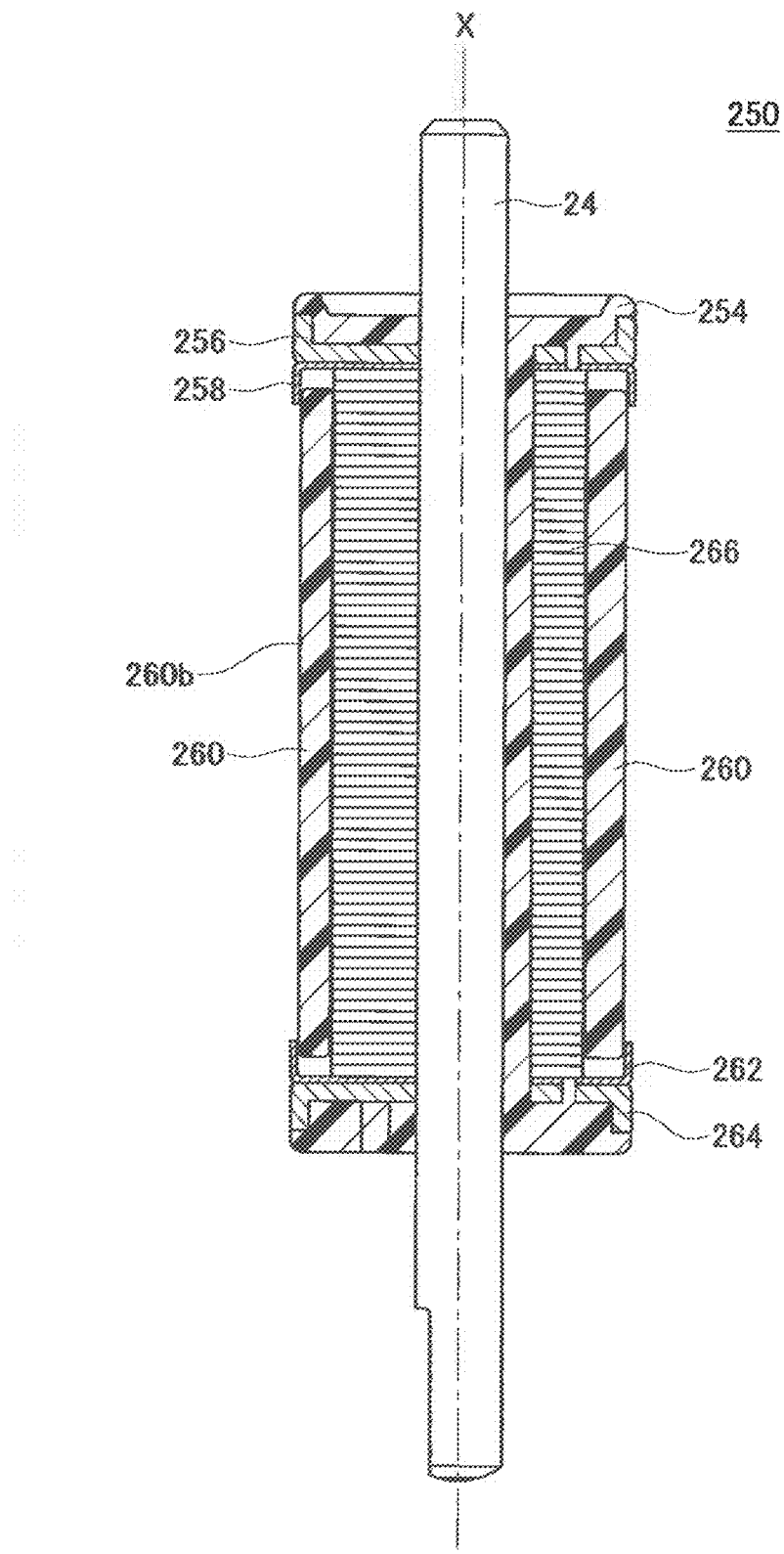
FIG. 40 shows a cross-sectional view along XXXIV-XXXIV according to a modification.

In the above embodiment, in the perpendicular cross-section, the outer circumferential surface 260a of the permanent magnet 260 that is in contact with the peripheral wall portion 282 is closer to the axial line X than the outer circumferential surface 260b of the permanent magnet 260 by an amount corresponding to the thickness of the magnet holder 258. However, as shown in FIG. 40, in the perpendicular cross-section, the outer circumferential surface 260b of the permanent magnet 260 may be at the same distance from the axial line X over an entire area that extends from the upper end to the lower end. Alternatively, in the perpendicular cross-section, the outer circumferential surface 260a may be closer to the axial line X than the outer circumferential surface 260b by an amount that is equal to or smaller than the thickness of the magnet holder 258.

Moreover, the outer diameter of the pressing member 256 may be the same as the outer diameter of the magnet holder 258.

Figure 41:
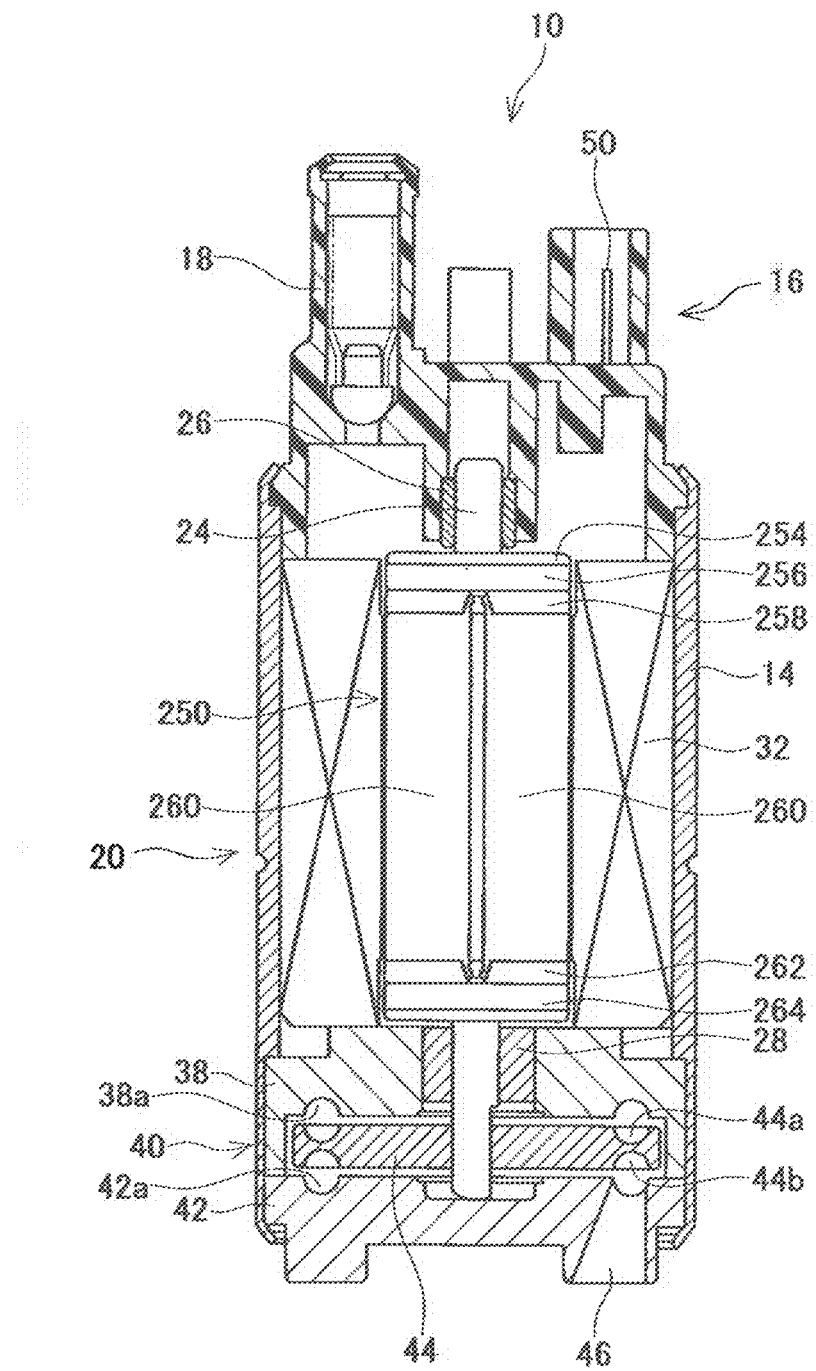
FIG. 41 shows a longitudinal cross-sectional view of a fuel pump according to a modification.

In the above embodiment, the clearance between the rotor 250 and the stator 32 is constant. However, as shown in FIG. 41, the clearance between the rotor 250 and the stator 32 may be set such that the clearance between the permanent magnet 260 and the stator 32 is smaller than the clearance between the other portion (for example, the magnet holder 258) of the rotor 250 and the stator 32. According to this configuration, it is possible to further decrease the clearance between the rotor 250 and the stator 32.

In the above embodiment, the magnet holder 258 includes four peripheral wall portions 282. However, the magnet holder 258 may include five or more peripheral wall portions and may include three or less peripheral wall portions. In this modification, the angle θ between both ends of a connecting part that connects the peripheral wall portion and the outer circumference part may be set to 40° or more.

In the above embodiment, one peripheral wall portion 282 is connected to one outer circumference part 284. However, one peripheral wall portion 282 may be connected to two or more outer circumference parts 284. Alternatively, two or more peripheral wall portions 282 may be connected to one outer circumference part 284. That is, the number of peripheral wall portions 282 may be different from the number of outer circumference parts 284.

Moreover, although the magnet holders 258 and 262 engage with both ends in the direction of the axial line X of the permanent magnet 260, the magnet holders 258 and 262 may engage with only one end in the direction of the axial line X of the permanent magnet 260. Moreover, the position of the boundary between the adjacent permanent magnets 260 and the position of the notch 292 may be not identical in the circumferential direction of the permanent magnet 260. For example, the position of the boundary between the adjacent permanent magnets 260 and the position of the notch 292 may be shifted by 45° in the circumferential direction of the permanent magnet 260.

In the above embodiment, the resin layer 254 is disposed on a side of the pressing members 256 and 264 opposite to the permanent magnet 260. However, the resin layer 254 may be disposed between the pressing member 256 and the magnet holder 258. Similarly, the resin layer 254 may be disposed between the pressing member 264 and the magnet holder 262.

(Seventh Embodiment)

Figure 42:
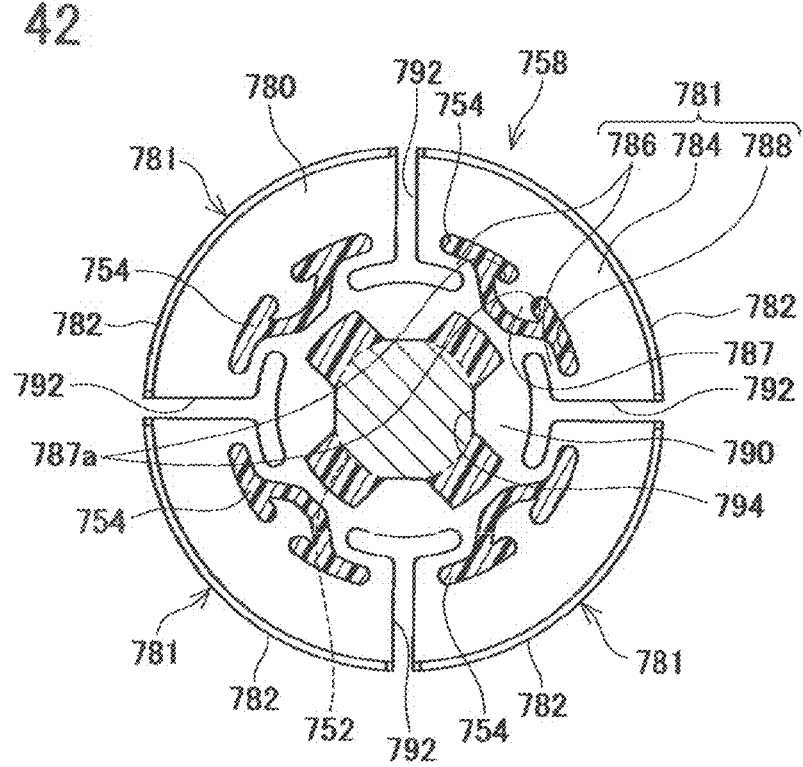
FIG. 42 shows a plan view of a magnet holder according to a seventh embodiment.
Figure 43:
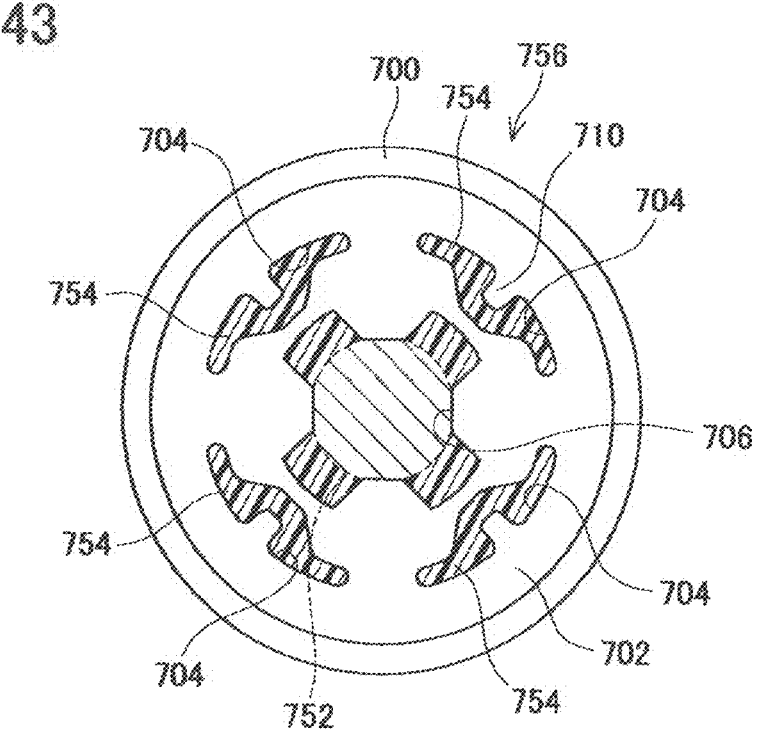
FIG. 43 shows a plan view of a pressing member according to the seventh embodiment.

A difference from the sixth embodiment will be described. As shown in FIGS. 42 and 43, in the seventh embodiment, the shape of a magnet holder 758 is different from the shape of the magnet holders 258 and 262, and the shape of a pressing member 756 is different from that of the pressing members 256 and 264. Moreover, the shape of a resin layer 754 is different from the shape of the resin layer 254. FIGS. 42 and 43 show a cross-section of the resin layer 754 and a cross-section of a shaft 752. The other configuration is the same as the configuration of the fuel pump 10 (that is, the motor portion 20) according to the sixth embodiment. In the following description, the same configurations as those of the fuel pump 10 according to the sixth embodiment will be denoted by the same reference numerals as those used in the sixth embodiment.

The magnet holder 758 is disposed on the upper and lower surfaces of the back yoke 266 and the permanent magnet 260. The magnet holder 758 is formed of a non-magnetic material. As shown in FIG. 42, the magnet holder 758 includes a base portion 780 and a plurality of (four in this embodiment) peripheral wall portions 782. The peripheral wall portion 782 is the same as the peripheral wall portion 282.

The base portion 780 has a circular planar shape. The base portion 780 of one magnet holder 768 faces the upper surface of the back yoke 266 and the upper surface of the permanent magnet 260. The base portion 780 of the other magnet holder 768 faces the lower surface of the back yoke 266 and the lower surface of the permanent magnet 260. The outer diameter of the base portion 780 in a state before being attached to the plurality of permanent magnets 260 is slightly smaller than the outer diameter of a cylinder that is formed by the outer circumferential surfaces 260a of the plurality of permanent magnets 260. The base portion 780 includes an inner circumference part 790 and a plurality of (four in this embodiment) peripheral parts 781.

The inner circumference part 790 has such a ring shape that has the same through-hole 794 as the through-hole 294 at a central portion thereof. The shaft 752 is press-fitted to the through-hole 794. Each communication hole of the through-hole 794 communicates with each communication hole 270 that is formed by the shaft 752 and the back yoke 266.

The plurality of peripheral parts 781 is disposed at an interval around the outer edge of the inner circumference part 790. The same notch 792 as the notch 292 is formed between the adjacent peripheral parts 781. Each peripheral part 781 has a partially circular shape. The inner circumference part 790 is connected to the inner circumferential edge of each peripheral part 781. A connecting part that is connected to the peripheral wall portion 782 is formed on the outer circumferential edge of each peripheral part 781. On an inner edge side of each peripheral part 781, a beam part 786 is formed on both ends in the circumferential direction of each peripheral part 781. That is, each peripheral part 781 includes two beam parts 786. Each beam part 786 is a portion of the base portion 780 that has a smallest width. Each beam part 786 is a portion of the base portion 780 that has a lowest rigidity. Each beam part 786 extends obliquely in the first rotation direction (that is, the radial direction of the base portion 780) in relation to the circumferential direction, and the inner circumference part 790 is connected to one end of each beam part 786. An outer circumference part 784 is connected to the other end of each beam part 786. That is, the inner circumference part 790 and the outer circumference part 784 are connected by two beam parts 786. Each of the two beam parts 786 is connected to one end in the circumferential direction of the outer circumference part 784. A through-hole 788 is formed between each of the plurality of outer circumference parts 784 and the inner circumference part 790.

Each through-hole 788 passes through the base portion 780 in a direction from the upper surface to the lower surface (that is, the through-hole 788 passes through both ends in the axial direction of the shaft 752). The through-hole 788 is formed between the inner circumference part 790 and the outer circumference part 784. The through-hole 788 is formed along the outer circumference part 784 of the beam part 786. In other words, the beam part 786 is formed between the through-hole 788 and the notch 792. The through-hole 788 is formed continuously so as to extend from an end of one beam part 786 closer to the outer circumference part 784 to an end of the other beam part 786 closer to the outer circumference part 784.

The outer circumference part 784 includes a contacting portion 787. The contacting portion 787 is formed in such a manner that an edge of the outer circumference part 784 closer to the inner circumference part 790 protrudes toward the inner circumference part 790. The contacting portion 787 includes a contacting surface 787a that is formed at the central portion of the through-hole 788 so as to extend in the circumferential direction.

Similarly to the connecting part 281a, in a connecting part between the base portion 780 and the peripheral wall portion 782, in a plane perpendicular to the axial line X, the angle θ between a line that connects one end in the circumferential direction of the connecting part and the center O (that is, the center of the shaft 752) of the base portion 780 and a line that connects the other end in the circumferential direction of the connecting part and the center O of the base portion 780 is 86°.

When the magnet holder 758 is attached to the permanent magnets 260, the permanent magnet 260 engages with a cylinder that is formed by the plurality of peripheral wall portions 782. In this case, similarly to the magnet holder 758, the beam part 786, that has the lowest rigidity is deformed, of the base portion 780, and the outer circumference part 784 is displaced so as to be separated from the inner circumference part 790. As a result, the peripheral wall portion 782 is maintained at a vertical angle with respect to the base portion 780.

The pressing member 756 is disposed on a side of the magnet holder 758 opposite to the permanent magnet 260. As shown in FIG. 43, the pressing member 756 includes a pressing portion 702 and an outer circumferential portion 700. The outer circumferential portion 700 has the same configuration as the outer circumferential portion 300. The pressing portion 702 has a disk shape. The pressing portion 702 has approximately the same radius as the base portion 780 in a state of being attached to the permanent magnet 260. The pressing portion 702 is attached to the shaft 752 in a state of being in contact with the base portion 780. The same through-hole 706 as the through-hole 306 is formed at the central portion of the pressing portion 702. The shaft 752 is press-fitted to the through-hole 706. Due to this, a communication hole that communicates with the communication hole 270 is formed in the through-hole 706.

The pressing portion 702 includes through-holes 704 that are positioned above the through-holes 788. Each through-hole 704 has an outer shape that follows the outer shape of the corresponding through-hole 788. The pressing portion 702 includes contact portions 710 that make contact with a corresponding surface of the contacting portions 787 opposite to the permanent magnets 260. According to this configuration, it is possible to suppress the contacting portions 787 from being deformed toward the side opposite to the permanent magnets 260.

The resin layer 754 (i.e., a first and second resin portion) is disposed on a side of the pressing member 756 opposite to the permanent magnets 260. The resin layer 754 is integrally formed so as to pass through the through-hole 270 from a side opposite to the permanent magnet 260 of the pressing portion 702, of the pressing member 756 that is positioned above the rotor 250 to the side opposite to the permanent magnets 260 of the pressing portion 702, of the pressing member 756 that is positioned below the rotor 250. Moreover, the resin layer 754 (i.e., a fifth resin portion) is disposed in the through-hole 704 of the pressing member 756 and the through-hole 788 of the magnet holder 758. That is, the resin layer 754 passes through the through-hole 788. The contacting surface 787a of the contacting portion 787 makes contact with the resin layer 754 that is positioned closer to the outer circumference side more than the contacting surface 787a from an inner circumference side (the shaft 752 side). When a force that is directed toward the outer side in the second radial direction is applied to the permanent magnet 260 during rotation of the rotor 250, the force that is directed toward the outer side in the second radial direction is applied from the permanent magnet 260 to the peripheral wall portion 782 of the magnet holder 758. The resin layer 754 is inserted in the through-hole 704 of the pressing member 756 and the through-hole 788 of the magnet holder 758. Thus, the beam parts 786 of the magnet holder 758 can be restricted from being deformed toward the outer side in the second radial direction by making contact with the resin layer 754. Further, the entire contacting surfaces 787a of the contacting portions 787 make contact with the resin layer 754 from the inner circumference side. Thus, the outer circumference parts 784 are reliably restricted from moving toward the outer side in the second radial direction. As a result, it is possible to restrict the beam parts 786 from being deformed toward the outer side in the second radial direction.

Moreover, in the seventh embodiment, it is also possible to obtain the same advantages as those of the sixth embodiment.

(Eighth Embodiment)

Figure 44:
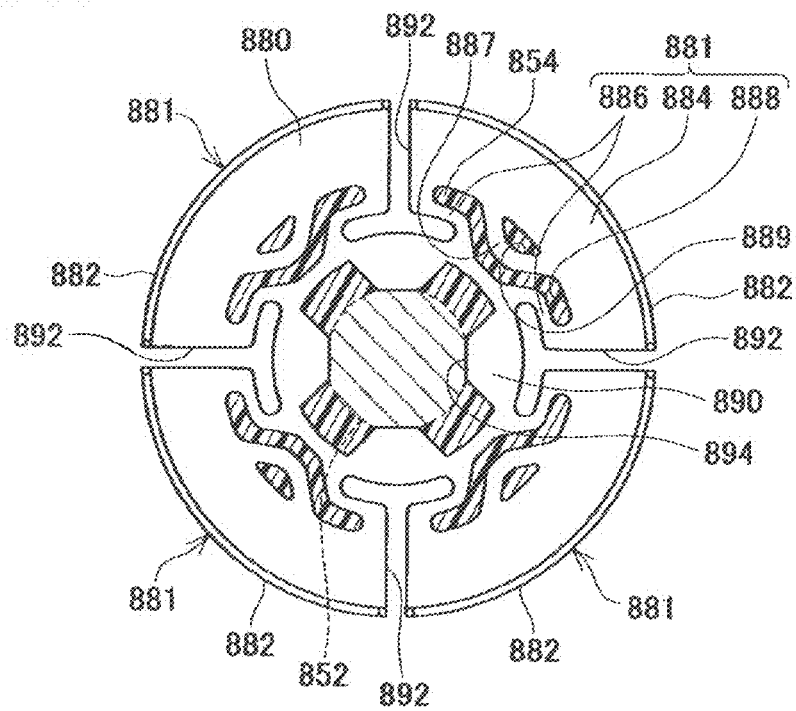
FIG. 44 shows a plan view of a magnet holder according to an eighth embodiment.
Figure 45:
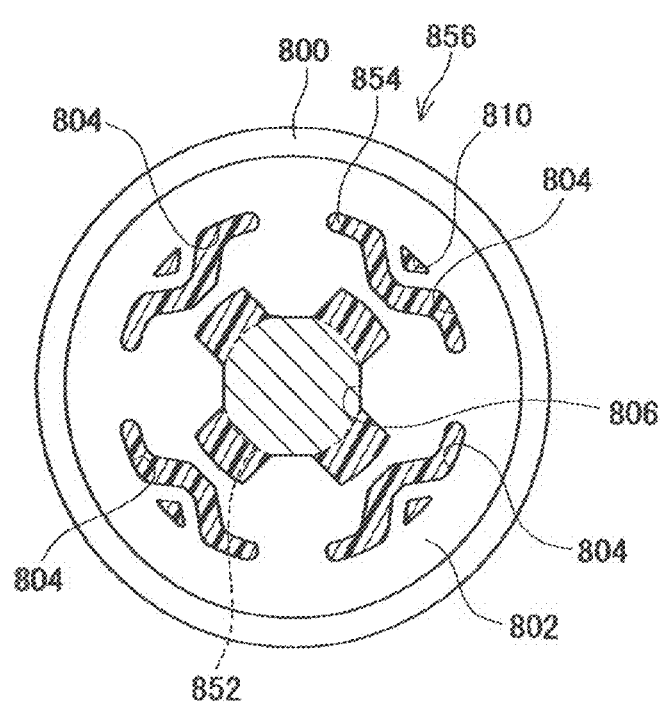
FIG. 45 shows a plan view of a pressing member according to the eighth embodiment.

A difference from the seventh embodiment will be described. As shown in FIG. 44, in the eighth embodiment, the shape of a magnet holder 858 is different from the shape of the magnet holder 758, and the shape of a pressing member 856 is different from the shape of the pressing member 756. Moreover, the shape of a resin layer 854 is different from the shape of the resin layer 754. FIGS. 44 and 45 show a cross-section of the resin layer 854 and a cross-section of a shaft 852. The arrangement of the magnet holder 858, the pressing member 856, and the resin layer 854 is the same as the arrangement of the magnet holder 758, the pressing member 756, and the resin layer 754. The other configuration is the same as the configuration of the fuel pump 10 (that is, the motor portion 20) according to the seventh embodiment. In the following description, the same configurations as those of the fuel pump 10 will be denoted by the same reference numerals as those used in the seventh embodiment.

As shown in FIG. 44, the magnet holder 858 includes a base portion 880 and a plurality of (four in this embodiment) peripheral wall portions 882. The peripheral wall portion 882 is the same as the peripheral wall portion 782.

The base portion 880 has a circular planar shape. The outer diameter of the base portion 880 in a state before being attached to the plurality of permanent magnets 260 is slightly smaller than the outer diameter of a cylinder that is formed by the outer circumferential surfaces 260a of the plurality of permanent magnets 260. The base portion 880 includes an inner circumference pail 890 and a plurality of (four in this embodiment) peripheral parts 881.

The inner circumference part 890 has such a ring shape that has the same through-hole 894 as the through-hole 794 at a central portion thereof. The shaft 852 is press-fitted to the through-hole 894. Each communication hole of the through-hole 894 communicates with each communication hole 270 that is formed by the shaft 852 and the back yoke 266.

The plurality of peripheral parts 881 is disposed at an interval around the outer edge of the inner circumference part 890. The same notch 892 as the notch 792 is formed between the adjacent peripheral parts 881. Each peripheral part 881 has a partially circular shape. The inner circumference part 890 is connected to the inner circumferential edge of each peripheral part 881. A connecting part that is connected to the peripheral wall portion 882 is formed on the outer circumferential edge of each peripheral part 881. On an inner edge side of each peripheral part 881, a beam part 886 is formed on both ends in the circumferential direction of each peripheral part 881. That is, each peripheral part 881 includes two beam parts 886. Each beam part 886 is a portion of the base portion 880 that has a smallest width. Each beam part 886 is a portion of the base portion 880 that has a lowest rigidity. Each beam part 886 extends obliquely in the first radial direction (that is, the radial direction of the base portion 880) in relation to the circumferential direction, and the inner circumference part 890 is connected to one end of each beam part 886. An outer circumference part 884 is connected to the other end of each beam part 886. That is, the inner circumference part 890 and the outer circumference part 884 are connected by two beam parts 886. Each of the two beam parts 886 is connected to one end in the circumferential direction of the outer circumference part 884. A through-hole 888 is formed between each of the plurality of outer circumference parts 884 and the inner circumference part 890.

The through-hole 888 passes through the base portion 880 in a direction from the upper surface to the lower surface (that is, the through-hole 888 passes through both ends in the axial direction of the shaft 852). The through-hole 888 is formed between the inner circumference part 890 and the outer circumference part 884. The through-hole 888 is formed along the outer circumference part 884 of the beam part 886. In other words, the beam part 886 is formed between the through-hole 888 and the notch 892. The through-hole 888 is formed continuously so as to extend from an end of one beam part 886 closer to the outer circumference part 884 to an end of the other beam part 886 closer to the outer circumference part 884.

The outer circumference part 884 includes a through-hole 889 that passes through the base portion 880 in a direction from the upper surface to the lower surface (that is, in the axial direction of the shaft 852). The through-hole 889 has a triangular shape. The shape of the through-hole 889 is not limited to a triangular shape but may be other shape such as a quadrangular shape or a circular shape. The through-hole 889 is formed closer to the outer circumference side than the through-hole 888. The outer circumference part 884 further includes a contacting portion 887. The contacting portion 887 is formed at an edge closer to the inner circumference side of the through-hole 889. The contacting portion 887 is formed between the through-hole 888 and the through-hole 889. The contacting portion 887 is formed so as to extend over the entire length of the edge closer to the inner circumference side of the through-hole 889.

Similarly to the respective embodiments described above, in a connecting part between the base portion 880 and the peripheral wall portion 882, in a plane perpendicular to the axial line X, the angle θ between a line that connects one end in the circumferential direction of the connecting part and the center O (that is, the center of the shaft 852) of the base portion 880 and a line that connects the other end in the circumferential direction of the connecting part and the center O of the base portion 880 is 86°.

When the magnet holder 858 is attached to the permanent magnet 260, the permanent magnet 260 engages with a cylinder that is formed by the plurality of peripheral wall portions 882. In this case, similarly to the magnet holder 858, the beam part 886 of the base portion 880 that has the lowest rigidity is deformed, and the outer circumference part 884 is displaced so as to be separated from the inner circumference part 890. As a result, the peripheral wall portion 882 is maintained at a vertical angle with respect to the base portion 880.

The pressing member 856 is disposed on a side of the magnet holder 858 opposite to the permanent magnet 260. As shown in FIG. 45, the pressing member 856 includes a pressing portion 802 and an outer circumferential portion 800. The outer circumferential portion 800 has the same configuration as the outer circumferential portion 700. The pressing portion 802 has a disk shape. The pressing portion 802 has approximately the same radius as the base portion 880 in a state of being attached to the permanent magnet 260. The pressing portion 802 is attached to the shaft 852 in a state of being in contact with the base portion 880. The same through-hole 806 as the through-hole 706 is formed at the central portion of the pressing portion 802. The shaft 852 is press-fitted to the through-hole 806. Due to this, a communication hole that communicates with the communication hole 270 is formed in the through-hole 806.

The pressing portion 802 includes a through-hole 804 that is positioned above the through-hole 888. The through-hole 804 has an outer shape that follows the outer shape of the through-hole 888. The pressing portion 802 further includes a through-hole 810 that is positioned above the through-hole 889. The through-hole 810 has an outer shape that follows the outer shape of the through-hole 889.

The resin layer 854 is disposed on a side of the pressing member 856 opposite to the permanent magnet 260. The resin layer 854 is integrally formed so as to pass through the through-hole 270 from a side opposite to the permanent magnet 260 of the pressing portion 802, of the pressing member 856 that is positioned above the rotor 250 to a side opposite to the permanent magnet 260 of the pressing portion 802, of the pressing member 856 that is positioned below the rotor 250. Moreover, the resin layer 854 is disposed in the through-hole 804 of the pressing member 856 and the through-hole 888 of the magnet holder 858 and is also disposed in the through-hole 810 and the through-hole 889. That is, the resin layer 854 passes through the through-holes 888 and 889. The contacting portion 887 makes contact with the resin layer 854 in the through-hole 889 from an inner circumference side (the shaft 852 side). When a force that is directed toward the outer side in the second radial direction is applied to the permanent magnet 260 during rotation of the rotor 250, the force that is directed toward the outer side in the second radial direction is applied from the permanent magnet 260 to the peripheral wall portion 882 of the magnet holder 858. The resin layer 854 (i.e., a fifth resin portion) is inserted in the through-hole 804 of the pressing member 856 and the through-hole 888 of the magnet holder 858. Thus, the beam part 886 of the magnet holder 858 can be restricted from being deformed toward the outer side in the second radial direction by making contact with the resin layer 854. Further, an entire surface of the contacting portion 887 closer to the through-hole 889 makes contact with the resin layer 854 from the inner circumference side. Thus, the outer circumference part 884 is reliably restricted from moving toward the outer side in the second radial direction. As a result, it is possible to restrict the beam part 886 from being deformed toward the outer side in the second radial direction.

Moreover, in the eighth embodiment, it is also possible to obtain the same advantages as those of the sixth embodiment.

(Modification)

For example, a plurality of through-holes in which the resin layers 754 and 854 (i.e., fifth resin portions) are disposed may be formed in the outer circumference parts 784 and 884. For example, at least one through-hole in which the resin layer 854 is disposed may be formed in a portion of the outer circumference part 884 closer to the outer circumference side than the through-hole 889. In this case, a through-hole that overlaps the through-hole that is formed in the outer circumference part 884 may be formed in the pressing member 856. The resin layer 854 (i.e., the fifth resin portion) may pass through both the through-hole of the outer circumference part 881 and the through-hole of the pressing member 856.

The back electrodes 754 and 854 may be disposed outside the through-hole. For example, the resin layer may be disposed in the notch that is formed in the outer circumference parts 784 and 884, for example, a notch that extends in the circumferential direction from the notches 792 and 892. In this case, a contacting portion may be formed at an edge closer to the inner circumference side, of the notch that is formed in the outer circumference parts 784 and 884.

The invention claimed is:

1. A brushless motor comprising:
   a rotor; and
   a stator disposed at an outer circumference of the rotor, wherein
   the rotor comprises:
   a shaft;
   a back yoke fixed on the shaft;
   a permanent magnet disposed at an outer circumference of the back yoke;
   a magnet holder disposed on at least one end of the permanent magnet in a shaft axis direction;
   a first resin portion formed at one ends of the back yoke and the permanent magnet in the shaft axis direction, and configured to fix the back yoke and the permanent magnet; and
   a second resin portion formed at other ends of the back yoke and the permanent magnet in the shaft axis direction, and configured to fix the back yoke and the permanent magnet,
   a communication hole that communicates one end side and another end side in the shaft axis direction is formed through the back yoke, between the shaft and the back yoke, or in a combination thereof,
   a third resin portion is formed within the communication hole,
   the third resin portion is configured to connect with the first resin portion and the second resin portion, and
   the first resin portion, the second resin portion and the third resin portion are formed integrally, and
   the magnet holder is configured to regulate the permanent magnet to move in the shaft axis direction and a circumferential direction of the permanent magnet, wherein
   the magnet holder comprises:
   a base portion configured to oppose an end face of the permanent magnet; and
   a plurality of peripheral wall portions, each of which is configured to contact a contacting part of an outer circumferential surface of the permanent magnet located at the one end of the permanent magnet, and extend along a circumferential direction of the permanent magnet, and
   the base portion comprises:
   a plurality of outer circumference parts configured to connect to the plurality of peripheral wall portions;
   an inner circumference part configured to be located closer to the shaft than the plurality of outer circumference parts and surround the shaft; and
   a beam part configured to connect the plurality of outer circumference parts and the inner circumference part, the beam part being capable of deforming such that the outer circumference parts depart from the inner circumference part.

2. The brushless motor as in claim 1, wherein
   in a direction perpendicular to the shaft axis, the contacting parts of the outer circumferential surface of the permanent magnet are formed closer to the shaft than other parts of the outer circumferential surface of the permanent magnet.

3. The brushless motor as in claim 1, wherein
   each of the plurality of the peripheral wall portions is connected to the corresponding outer circumference part at a connecting part extending along the outer circumferential surface of the permanent magnet,
   in a plane perpendicular to the shaft axis, an angle between a line connecting one end of the connecting part and a shaft center and a line connecting another end of the connecting part and the shaft center is equal to or more than 40 degrees.

4. The brushless motor as in claim 1, wherein
   each of the plurality of outer circumference parts is connected to the inner circumference part by two or more beam parts.

5. The brushless motor as in claim 1, wherein
   the rotor further comprises a pressing member configured to contact a surface of the base portion at an opposite side from the permanent magnet, and press the base portion from the opposite side from the permanent magnet toward the permanent magnet.

6. The brushless motor as in claim 5, wherein
   in the direction perpendicular of the shaft axis, an outer diameter of the pressing member is larger than an outer diameter of the permanent magnet and an outer diameter of the magnet holder.

7. The brushless motor as in claim 1, wherein
   the rotor further comprises a fifth resin portion configured to regulate deformation of the beam part.

8. The brushless motor as in claim 7, wherein
   the base portion comprises, in each of the plurality of the outer circumference parts, a contacting hole configured to pass through the base portion in the shaft axis direction at a position located circumferentially outside the beam part connected to the outer circumference part,
   the fifth resin portion is disposed in the contacting hole, and
   each of the plurality of the outer circumference parts comprises a contacting portion configured to contact the fifth resin portion disposed within the contacting hole from an inner circumferential side.

* * * * *

UNITED STATES PATENT AND TRADEMARK OFFICE
CERTIFICATE OF CORRECTION

PATENT NO. : 9,246,365 B2  
APPLICATION NO. : 13/745593  
DATED : January 26, 2016  
INVENTOR(S) : Y. Honda et al.

Page 1 of 1

It is certified that error appears in the above-identified patent and that said Letters Patent is hereby corrected as shown below:

Title Page,

Item (74) Attorney: Please delete "Vienna" and replace with -- Vierra --.

Item (57) Abstract, lines 4-5: After "one" and before "of" please delete "ends" and replace with -- end --.

Item (57) Abstract, line 7: After "fixed" and before "the" please insert -- to --.

In the Claims,

Column 31, line 28, claim 1: After "one" and before "of", please delete "ends" and replace with -- end --.

Signed and Sealed this  
Nineteenth Day of July, 2016

Michelle K. Lee  
*Director of the United States Patent and Trademark Office*